US012574203B2

(12) United States Patent
Vogel et al.

(10) Patent No.: US 12,574,203 B2
(45) Date of Patent: *Mar. 10, 2026

(54) SECURE MULTI-RAIL CONTROL FOR SPARSELY ENCODED SIGNALS

(71) Applicant: Google LLC, Mountain View, CA (US)

(72) Inventors: Pirmin Robert Vogel, Zurich (CH); Christopher Gori, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/715,590

(22) PCT Filed: Dec. 2, 2022

(86) PCT No.: PCT/US2022/080827
§ 371 (c)(1),
(2) Date: May 31, 2024

(87) PCT Pub. No.: WO2023/102532
PCT Pub. Date: Jun. 8, 2023

(65) Prior Publication Data
US 2025/0150096 A1 May 8, 2025

Related U.S. Application Data

(60) Provisional application No. 63/285,965, filed on Dec. 3, 2021.

(51) Int. Cl.
*H04L 9/00* (2022.01)
(52) U.S. Cl.
CPC .................................... *H04L 9/002* (2013.01)
(58) Field of Classification Search
CPC ....................................................... H04L 9/002
See application file for complete search history.

(56) References Cited

U.S. PATENT DOCUMENTS

| | | |
|---|---|---|
| 7,412,475 B1 | 8/2008 | Govindarajalu |
| 8,718,184 B1 * | 5/2014 | Cronie .................... G06F 13/42 375/295 |

(Continued)

FOREIGN PATENT DOCUMENTS

| | | |
|---|---|---|
| CN | 111666246 | 9/2020 |
| CN | 111859472 | 10/2020 |

(Continued)

OTHER PUBLICATIONS

"International Preliminary Report on Patentability", Application No. PCT/US2022/080827, May 2, 2024, 7 pages.

(Continued)

*Primary Examiner* — Joseph D Torres
(74) *Attorney, Agent, or Firm* — Colby Nipper PLLC

(57) ABSTRACT

Techniques, apparatuses, and systems for secure multi-rail control for sparsely encoded signals are disclosed. Integrated circuits (ICs) may transmit various signals to manage interactions between circuit components of the IC. These critical signals are common targets for malicious attacks because, when altered, they can cause the IC to perform differently than is intended, and in some cases, bypass security measures. While various strategies may be used to protect against these attacks, modern circuit synthesis tools may optimize away these security measures, leaving the IC vulnerable to manipulation. In contrast, the secure multi-rail control for sparsely encoded signals described herein utilizes multiple rails to transmit sparsely encoded critical signals. Each rail may be controlled by a separate finite state machine (FSM) to reduce vulnerabilities that may arise due to circuit synthesis, provide an adjustable solution that may be leveraged differently based on implementation, and provide comportability to different ICs.

20 Claims, 8 Drawing Sheets

(56) References Cited

U.S. PATENT DOCUMENTS

| | | | |
|---|---|---|---|
| 8,989,317 B1 * | 3/2015 | Holden | H04L 25/4908 |
| | | | 375/330 |
| 9,152,512 B2 | 10/2015 | Cronin et al. | |
| 9,183,085 B1 | 11/2015 | Northcott | |
| 10,691,534 B2 | 6/2020 | Hsiao et al. | |
| 10,908,987 B1 | 2/2021 | Pandey et al. | |
| 12,339,959 B2 * | 6/2025 | Vogel | H04L 9/0631 |
| 2002/0053062 A1 * | 5/2002 | Szymanski | H03M 13/6575 |
| | | | 714/801 |
| 2005/0076266 A1 | 4/2005 | Costin | |
| 2007/0055868 A1 * | 3/2007 | Brier et al. | |
| 2011/0302478 A1 * | 12/2011 | Cronie | H03M 5/16 |
| | | | 375/295 |
| 2012/0151159 A1 | 6/2012 | Muralimanohar et al. | |
| 2012/0213299 A1 * | 8/2012 | Cronie | H04L 1/0045 |
| | | | 375/259 |
| 2016/0283314 A1 | 9/2016 | Thanner et al. | |
| 2017/0123896 A1 | 5/2017 | Baek et al. | |
| 2017/0177259 A1 | 6/2017 | Motwani | |
| 2017/0308433 A1 | 10/2017 | Kwon et al. | |
| 2019/0155754 A1 | 5/2019 | Kida et al. | |
| 2020/0021308 A1 | 1/2020 | Meier | |
| 2020/0021427 A1 * | 1/2020 | Montoya | H04L 9/0662 |
| 2020/0034528 A1 | 1/2020 | Yang et al. | |
| 2020/0042465 A1 | 2/2020 | Duval | |
| 2020/0278937 A1 | 9/2020 | Durham et al. | |
| 2021/0006353 A1 | 1/2021 | Hoermaier et al. | |
| 2021/0049309 A1 | 2/2021 | Su | |
| 2021/0050941 A1 | 2/2021 | Das et al. | |
| 2021/0089388 A1 | 3/2021 | Makaram et al. | |
| 2021/0099469 A1 | 4/2021 | Zeh et al. | |
| 2021/0255942 A1 | 8/2021 | Jung et al. | |
| 2021/0328761 A1 * | 10/2021 | Guilley | G06F 11/1044 |
| 2021/0365566 A1 | 11/2021 | Souissi et al. | |
| 2022/0091928 A1 | 3/2022 | Fernandes et al. | |
| 2022/0391540 A1 | 12/2022 | Roberts et al. | |
| 2023/0043152 A1 * | 2/2023 | O'Connor | G06T 1/60 |
| 2023/0177154 A1 | 6/2023 | Vogel et al. | |

FOREIGN PATENT DOCUMENTS

| | | |
|---|---|---|
| EP | 3584737 | 12/2019 |
| JP | S54102839 A | 8/1979 |
| JP | 2003506750 A | 2/2003 |
| JP | 2015216469 A | 12/2015 |
| JP | 2016100725 A | 5/2016 |
| JP | 2019205015 A | 11/2019 |
| WO | 2018034682 A1 | 2/2018 |
| WO | 2020211070 A1 | 10/2020 |
| WO | 2022217260 | 10/2022 |
| WO | 2023102532 | 6/2023 |

OTHER PUBLICATIONS

"Foreign Office Action", JP Application No. 2023-557177, Oct. 8, 2024, 24 pages.

"Non-Final Office Action", U.S. Appl. No. 18/061,307, filed Sep. 20, 2024, 18 pages.

"Foreign Office Action", JP Application No. 2023-557177, Apr. 22, 2025, 4 pages.

"Foreign Office Action", IN Application No. 202347059609, Apr. 23, 2025, 6 pages.

"Foreign Office Action", JP Application No. 2024-532818, Jun. 2, 2025, 7 pages.

"Notice of Allowance", U.S. Appl. No. 18/061,307, Mar. 12, 2025, 8 pages.

"Final Office Action", U.S. Appl. No. 17/338,329, Mar. 1, 2024, 17 pages.

"Foreign Office Action", TW Application No. 111113366, Oct. 3, 2022, 11 pages.

"International Preliminary Report on Patentability", Application No. PCT/US2022/071604, Oct. 10, 2023, 8 pages.

"International Search Report and Written Opinion", Application No. PCT/US2022/080827, Apr. 12, 2023, 11 pages.

"International Search Report and Written Opinion", Application No. PCT/US2022/071604, Jul. 21, 2022, 11 pages.

"Method of Combinational Circuits Testing by Dividing its Outputs into Groups and Using Codes, that Effectively Detect Double Errors", Sep. 29, 2017, 8 pages.

"Non-Final Office Action", U.S. Appl. No. 17/338,329, Aug. 16, 2023, 11 pages.

"Foreign Office Action", EP Application No. 22847213.0, Apr. 23, 2025, 5 pages.

"Non-Final Office Action", U.S. Appl. No. 18/552,602, Aug. 6, 2025, 27 pages.

"Foreign Office Action", KR Application No. 10-2024-7018977, Dec. 22, 2025, 7 pages.

* cited by examiner

100

102-1
102-2
102-3
102-4
102-5
102-6
102-7
102-8

Apparatus 102

Integrated Circuit 104

Processors
106

Computer-Readable
Media
108

Device Data
110

Security Circuitry
112

Circuit Component
114-1

Circuit Component
114-n

Crypto IP Block
116

FSMs
118

Rails
120

Interconnect
122

Display
124

Transceivers
126

I/O Ports
128

Sensors
130

```
// The three modules below together implement
// the following operation with multi-rail
// logic.
// assign c = (a == HIGH) && (b == HIGH) ?
//    HIGH : LOW;

for (genvar i=0; i<Width; i++) begin
   if (HIGH[i] == 1'b1) begin
     and_p u_and_p_i (
       .a_i ( a_i[i] ),
       .b_i ( b_i[i] ),
       .c_o ( c [i] )
     );
   end else begin
     and_n u_and_n_i (
       .a_ni ( a_i[i] ),
       .b_ni ( b_i[i] ),
       .c_no ( c [i] )
     );
   end
  end
```

FIG. 6A

```
// The negated rail can be obtained from the
// positive rail by placing inverters on in
// and outputs, can be auto-generated.

module and_n (
  input  logic      a_ni,
  input  logic      b_ni, output logic      c_no,
);

logic c;

and_p u_and_p_i (
    .a_i ( ~a_ni ),
    .b_i ( ~b_ni ),
    .c_o ( c    )
  );

assign c_o = ~c;

endmodule
```

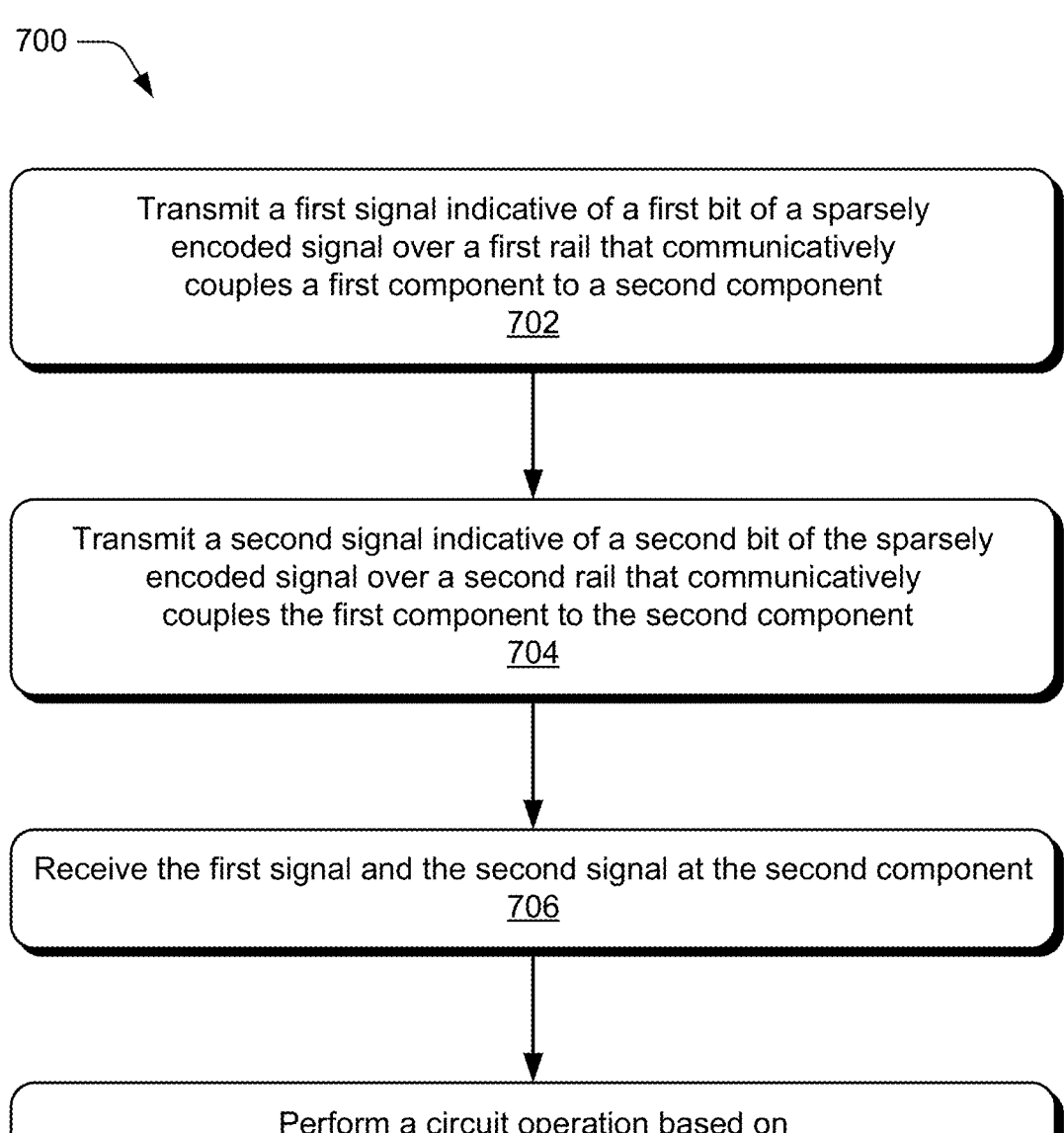

Transmit a first signal indicative of a first bit of a sparsely encoded signal over a first rail that communicatively couples a first component to a second component
702

Transmit a second signal indicative of a second bit of the sparsely encoded signal over a second rail that communicatively couples the first component to the second component
704

Receive the first signal and the second signal at the second component
706

Perform a circuit operation based on the first signal and the second signal
708

*FIG. 7*

SECURE MULTI-RAIL CONTROL FOR SPARSELY ENCODED SIGNALS

RELATED APPLICATION(S)

This application is a national stage entry of International Application No. PCT/US2022/080827, filed Dec. 2, 2022, which claims the benefit of U.S. Provisional Application No. 63/285,965, filed Dec. 3, 2021, the disclosures of which are incorporated herein by reference in their entirety.

BACKGROUND

Electronic devices often include at least one integrated circuit (IC) that enables various functionalities on an electronic device. To perform some of these functionalities securely, an electronic device may store or operate with secret information that is restricted to certain access levels within the IC. An attacker may attempt to gain unauthorized access to this secret information of the electronic device to compromise or alter the operations of the IC. Existing approaches to prevent unauthorized access, however, are often inadequate to combat evolving software, hardware, and wireless attacks employed by malicious actors who attempt to access the secret information of electronic devices.

SUMMARY

This document discloses techniques, apparatuses, and systems for secure multi-rail control for sparsely encoded signals. Integrated circuits (ICs) may transmit various signals to manage interactions between circuit components of the IC. These critical signals are common targets for malicious attacks because, when altered, they can cause the IC to perform differently than is intended, and in some cases, bypass security measures. While various strategies may be used to protect against these attacks, modern circuit synthesis tools reduce or eliminate the effectiveness of these security measures, leaving the IC vulnerable to manipulation. In contrast, the secure multi-rail control for sparsely encoded signals described herein utilizes multiple rails to transmit sparsely encoded critical signals. Each rail may be controlled by a separate finite state machine (FSM) to reduce vulnerabilities that can arise due to circuit synthesis, provide an adjustable solution that can be leveraged differently based on implementation, and provide comportability to different ICs.

An IC is described that includes a first component and a second component. The first component may include a plurality of FSMs. In aspects, the first component and the second component are coupled to one another through a plurality of separate data lines. Sparsely encoded signals having a minimum Hamming distance are used to communicate between the first and the second component. Each FSM of the plurality of FSMs may be coupled to the second component through a respective data line of the plurality of data lines. Each of the plurality of data lines may communicate a single bit of the sparsely encoded signal between the first and the second component. In this way, the IC may be protected against fault injection attacks, and the IC may resist unwanted circuit synthesis. The second component may, for example, comprise a second plurality of FSMs. In implementations, the first component may be any component of the IC and the second component may be any different component of the IC. The described systems and techniques may be utilized at any point where sensitive operations are occurring on a hardware device, for example, any processes that involve access control or a privileged level of operation (e.g., power, register access, system resets). In aspects, the described techniques may be utilized between any two components of the IC that perform such sensitive operations. In one example, the described secure multi-rail control logic is implemented within a cryptographic IP block of an IC (e.g., between two components of a cryptographic IP block). As further examples, the second component may be a multiplexer device or may include a storage register or a configurations and settings register.

This Summary is provided to introduce simplified concepts for implementing secure multi-rail control for sparsely encoded signals. The simplified concepts are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of the described techniques, apparatuses, and systems for secure multi-rail control for sparsely encoded signals are described below. The use of the same reference numbers in different instances in the description and the figures indicate similar elements:

FIGS. 6A and 6B illustrate example logic for implementing secure multi-rail control for sparsely encoded signals in accordance with one or more aspects;

FIG. 7 illustrates an example method for transmitting sparsely encoded signals using multiple rails.

DETAILED DESCRIPTION

Figure 1:
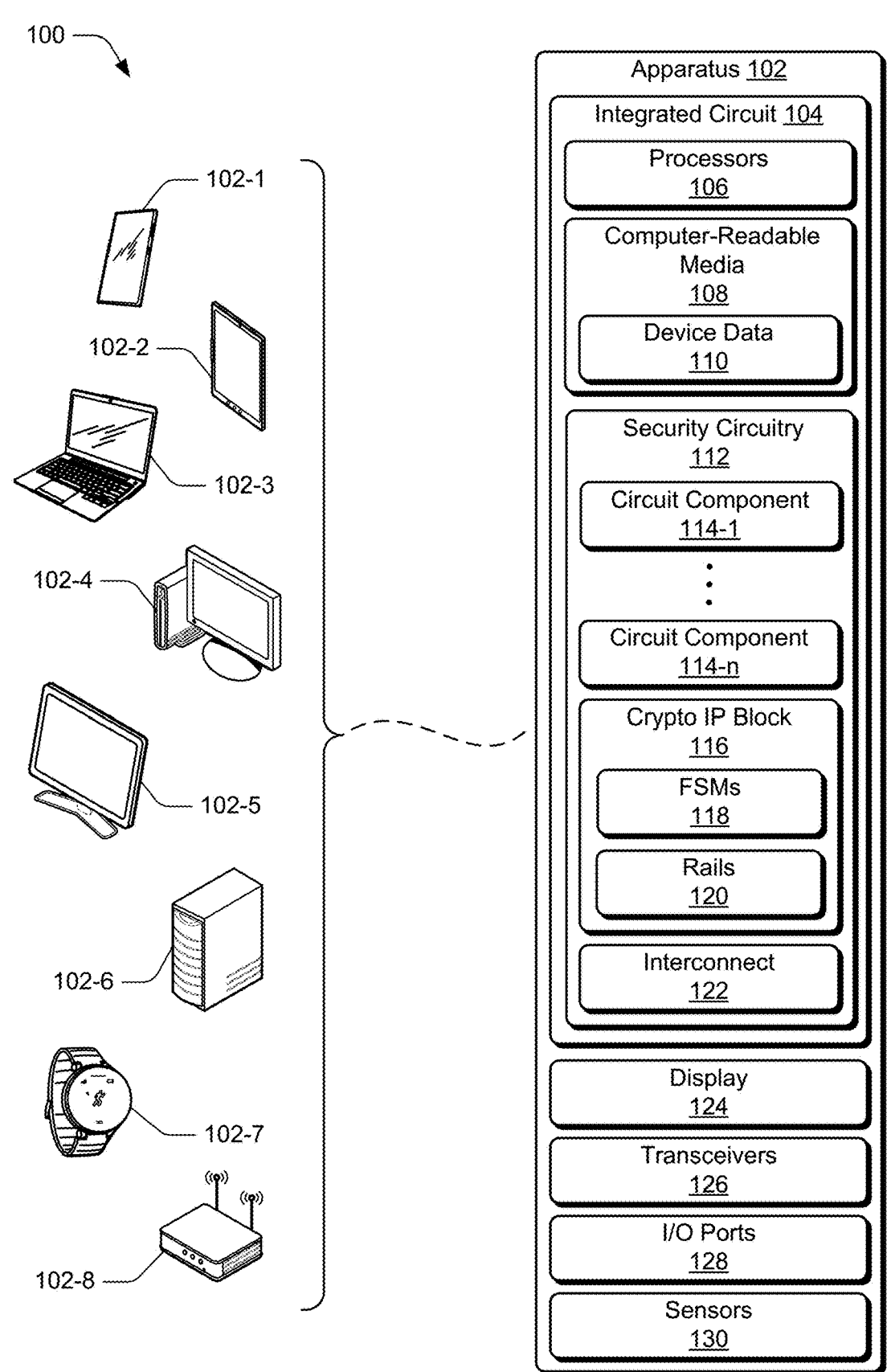
FIG. 1 illustrates an example operating environment that includes electronic devices that may implement secure multi-rail control for sparsely encoded signals.

In general, there are a variety of methods that attackers may use to gain access to privileged information (e.g., keys) maintained by an integrated circuit (IC). For example, fault injection attacks may be used to inject faults into signals transmitted between different circuit components of an integrated circuit. Various methods may be used to inject faults into an IC. For example, faults may be injected into an IC by using high-powered lasers, exposing the IC to electromagnetic interference, adjusting a clock of the IC, altering the power supply of an IC, or any combination of these methods. In some implementations, high-powered lasers may be used to inject faults with high accuracy. For example, a laser may be directed to the surface of a transistor to flip the transistor and transmit a signal with a different value.

ICs may use different signals to control circuit operations and, more specifically, manage interactions between different circuit components. In this way, these critical signals may directly affect or control which operations are performed by the IC as well as when the operations are performed. When faults are injected along with (or in place of) these signals, ICs may perform unintended operations and, in some cases, bypass security measures (e.g., secure boot/root-of-trust processes). For example, faults may be injected into handshakes to cause the IC to prematurely release intermediate values that are in the process of undergoing circuit operations. In this way, attackers may obtain or gain access to privileged information about the circuit (e.g., secret keys) by bypassing operations that have not yet been performed when the values are prematurely released. In other implementations, the values themselves may be indicative of privileged information maintained by the integrated circuit, for example, the value may be representative of a private key used by the IC.

Various techniques may be employed to reduce an ICs vulnerability to fault injection attacks, however, the increase in capability of modern circuit synthesis tools may cause complications when implementing these countermeasures. Specifically, modern circuit synthesis tools are designed to identify and reduce redundancies in circuit operations to improve the performance of an IC. Some security measures may utilize redundancies to increase the complexity of successfully implementing a malicious attack on ICs (e.g., successfully releasing privileged information). Thus, when employed within a cryptographic IC, these circuit synthesis tools may optimize the operations to produce a more efficient circuit that does not include the redundancies that were intentionally designed for security purposes, thereby eliminating important security features. To overcome these issues, cryptographic ICs may need to disable circuit synthesis tools, which can lead to decreased performance, or create custom multi-bit gates, which can increase cost and manufacturing complexity, decrease scalability, and decrease comportability.

In contrast to other solutions, the techniques discussed below utilize sparse encodings for signals (e.g., critical signals) transmitted between two circuit components. For example, each signal may be defined such that it has a predetermined minimum Hamming distance (e.g., the number of bits that are different between any two valid solutions). Specifically, if a value is representable in a one-bit representation (e.g., 1'b0 for LOW (e.g., as defined by transmitting a low voltage value) or 1'b1 for HIGH (e.g., as defined by transmitting a high voltage value)) and the predetermined minimum Hamming distance is three, a LOW value may be represented as 3'b010 and the HIGH value may be represented as 3'b101. In this way, an attacker may be required to flip multiple bits instantaneously (or within a small amount of time) to successfully inject a fault that creates a different valid solution.

Generally, in information theory, the Hamming distance between two data items of equal length (e.g., 32 bits) is the number of positions at which corresponding symbols or bit positions of the data items are different. For example, given two integers that are each represented by 16 bits and where each integer is a respective valid solution, the Hamming distance between the these two integers can be the number of positions at which corresponding bits are different between the two 16-bit data structures.

In aspects, the HIGH and LOW values may be represented as a mix of one and zero bits to increase the difficulty in a successful fault injection attack. In general, it may be easier to flip all bits within a signal to a single value (either HIGH or LOW e.g., one or zero). Thus, at least one HIGH bit and at least one LOW bit may be used to represent each sparsely encoded signal. To transmit the sparsely encoded signals, the IC described below may utilize multiple rails (e.g., dedicated data lines that can be used to transmit signals between a first circuit component and a second circuit component) that each carry a single bit of the sparsely encoded signal. Due to the mix in values, the multiple rails may include both positive rails and negated rails, which is explained further with respect to FIG. 3.

In some implementations, the multiple rails may transmit critical signals between two components of the IC. As a specific example, the multiple rails may communicatively couple a finite state machine (FSM) (e.g., in a first component of the IC) to another circuit component to transmit control signals (e.g., initializations, acknowledgements, terminations) between the FSM and the circuit component. Some control signals are single-bit signals that may be represented as either a single HIGH or a single LOW value. In aspects, a sparsely encoded signal (e.g., sparse encodings) may include signaling (e.g., transmitted logic values) having a set encoded values with non-adjacent codewords and/or codewords with a Hamming distance of at least two. For example, valid codewords, transmitted as bits on separate data lines, are codewords that may not be obtained from another codeword by glitching or flipping one bit value during an attack.

Figure 4:
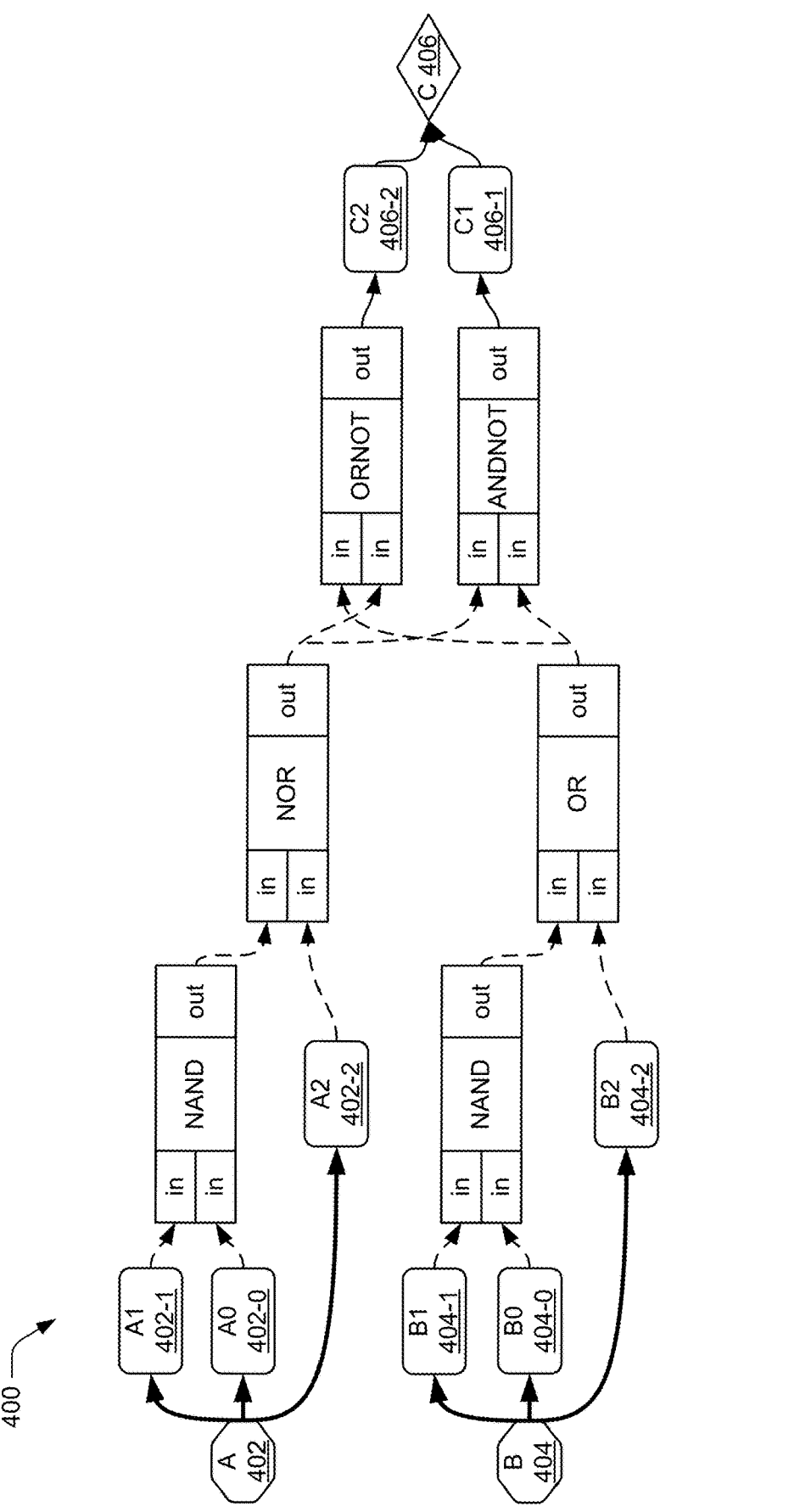
FIG. 4 illustrates example logic for an AND operation on sparsely encoded signals that is vulnerable to attacks due to circuit synthesis.

Due to the redundancy used to meet the minimum Hamming distance, circuit synthesis tools may reduce the effectiveness of the sparse encodings of these critical signals (explained in greater detail with respect to FIG. 4). Thus, to ensure that the techniques described are resistant to circuit optimization, the first circuit component (described above) may include a same number of FSMs as the quantity of the multiple rails. As such, each of the FSMs in the first circuit component may be communicatively coupled to a respective single rail of the multiple rails and used to drive a single bit of the sparsely encoded signal. In this way, the IC described below may be resistant to circuit optimization across the multiple FSMs/rails without disabling the circuit synthesis tools or requiring custom circuitry.

In yet another aspect, each of the multiple rails may be connected to a check module that may be used to compare the transmitted signal to a plurality of valid states, thus allowing for the IC to check for possible fault injection attempts. If the check module determines that the transmitted signal does not match any of the predefined valid states, the check module may signal an error and begin an error handling process. As such, the techniques, systems, and apparatuses for secure multi-rail control for sparsely encoded signals described below may provide an economical, scalable, and comportable solution to increase an IC's security against fault injection attacks.

FIG. 1 illustrates an example environment 100 that includes an apparatus 102 in which aspects of secure multi-rail control for sparsely encoded signals can be implemented. The apparatus 102 may be implemented as any suitable device, some of which are illustrated as a smartphone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). Although not shown, the apparatus 102 may also be implemented as any of a mobile station (e.g., fixed- or mobile-STA), a mobile communication device, a client device, a user equipment, a mobile phone, an entertainment device, a mobile gaming console, a personal media device, a media playback device, a health monitoring device, a drone, a camera, an Internet home appliance capable of wireless Internet access and browsing, an IoT device, and/or other types of electronic devices. The apparatus 102 may provide other functions or include components or interfaces omitted from FIG. 1 for the sake of clarity or visual brevity.

The apparatus 102 includes an integrated circuit (IC 104) that utilizes one or more processors 106 and computer-readable media 108, which may include memory media or storage media. The processors 106 may be implemented as a general-purpose processor (e.g., of a multicore central-processing unit (CPU) or application processor (AP)), an application-specific integrated circuit (ASIC), graphics processing unit (GPU), or a system on chip (SoC) with other components of the apparatus 102 integrated therein. The computer-readable media 108 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 108 of the apparatus 102 is implemented as at least one hardware-based or physical storage device, which does not include transitory signals or carrier waves. Applications, firmware, and/or an operating system (not shown) of the apparatus 102 can be embodied on the computer-readable media 108 as processor-executable instructions, which may be executed by the processor 106 to provide various functionalities described herein. The computer-readable media 108 may also store device data 110, such as user data or user media that is accessible through the applications, firmware, or operating system of the apparatus 102.

In this example, the IC 104 contains security circuitry 112. The apparatus 102, the IC 104, or the security circuitry 112 may implement a secure cryptographic processor. The security circuitry 112 may be implemented using one or more circuit components 114, for example, circuit component 114-1 through circuit component 114-n. The circuit components 114 may be organized to perform any number of operations to enable functionality of the apparatus 102. Examples of circuit components include a processor and multiple functional components as described in FIG. 2. The security circuitry 112 can be realized as, for example, a protected enclave, a trusted chip platform, a hardware-based root of trust (RoT) chip (e.g., a silicon RoT), and so forth. Regardless of how or where the security circuitry 112 is incorporated into an electronic device, the security circuitry 112 may counter many different types of attacks.

The security circuitry 112 may include at least one cryptographic intellectual property (IP) block 116 that performs various cryptographic operations of the IC 104. In some implementations, the at least one cryptographic IP block 116 may be implemented within an advanced encryption security (AES) unit. In aspects, the AES unit or the cryptographic IP block 116 may implement one or more cryptographic operations, e.g., an operation of encrypting data or decrypting data; the data may for example be image data (e.g., captured by a camera or video camera) or sound data (e.g., captured by a microphone). In one example, pseudo-random or true-random number values may be used to generate a private/public key pair. The public key is transmitted out of the apparatus 102 via the transceivers 126 and/or the I/O ports 128. The private key may be used to decrypt data (e.g., image/sound data) received by the apparatus 102 via the transceivers 126 and/or the I/O ports 128, and which is encrypted using the public key. Alternatively or additionally, data (e.g., obtained using the sensors 130), such as image or sound data, may be hashed using the private key to generate a hash digest, and the data and the hash digest may be transmitted out of the apparatus 102, via the transceivers 126 and/or the I/O ports 128, such that the hash digest functions as a signature for the data, which a third party can verify using the public key.

In another example, the cryptographic IP block 116 may perform Boolean masking and remasking operations on data operated on by the IC 104 based on pseudo-randomness provided by the pseudo-random or true-random number generator. The cryptographic IP block 116 may handle device secrets that are used to ensure the appropriate usage and performance of the IC 104, for example, cryptographic keys or other privileged information. To protect the privileged information handled by the cryptographic IP block 116, cryptographically secure operations may be performed to protect against various attacks that may release device secrets or information about the IC 104.

In aspects, the cryptographic IP block 116 may be configured to perform cryptographically secure operations in accordance with secure multi-rail control of sparsely encoded signals, as described herein. For example, the cryptographic IP block 116 may contain one or more finite state machine blocks (FSMs 118) that control operations of a cryptographic processor within the IC 104. As further described with respect to FIG. 3, the cryptographic IP block 116 may contain a main control FSM block that manages interactions of the cryptographic IP block 116 and the processors 106. For example, the main control FSM may transmit signals that control when values are written to registers to be accessed by the processors 106. The FSMs 118 may also include a core control FSM block (shown in FIG. 3) that coordinates internal operations of the cryptographic IP block 116.

In some implementations, the FSMs 118 may be implemented using multiple copies of the same FSM. For example, the main control FSM or core control FSM may be implemented as a set of identical (or similar) FSMs. In this way, each bit of a sparsely encoded signal that contains a multi-bit representation may be handled by an individual FSM. As such, each respective FSM of a first component (e.g., a main control FSM) may be communicatively coupled to a respective FSM of a second component (e.g., a core control FSM) and used to communicate a single bit of a sparsely encoded signal. In this way, the cryptographic IP block 116, or the IC 104 generally, may resist undesirable circuit synthesis that optimizes away security components.

The cryptographic IP block 116 may include multiple rails 120 between different components (e.g., the FSMs 118) of the cryptographic IP block 116. In aspects, the rails 120 may be used to transmit sparsely encoded signals between different components of the cryptographic IP block 116 or the IC 104. When communicating between a first circuit component and the FSMs 118 that are implemented through multiple copies of the FSM (e.g., the main FSM or the core FSM of the cryptographic IP block 116), each rail of the rails 120 may couple a single FSM from the first component to the second component. As such, each FSM and each of the rails 120 may communicate a single bit of the sparsely encoded signals and thus overcome issues related to circuit synthesis tools.

As described above, the sparsely encoded signals may be represented through a combination of HIGH and LOW bits. Therefore, the rails 120 may contain both positive and negated rails. In some implementations, a positive rail may carry a HIGH signal, whereas a negated rail may carry a LOW signal. In some other implementations, a signal carried by a particular rail (e.g., a negated rail) may be inverted to convey a desired signal state (e.g., a HIGH signal). In aspects, negated rails, or a component (e.g., FSM) that transmits one or more bits of the signal across the negated rails, may include an inverter that inverts the output of the value that is communicated by the first component. This also applies to positive rails or a component that transmits one or more bits of the signal across the positive rails. For example, if an FSM wants to transmit a HIGH signal (e.g., a one), a negated rail may carry a LOW signal and the inverter of that FSM can invert that LOW signal to a HIGH signal. Thus, a LOW signal may be carried as a HIGH signal over a negated rail and a HIGH signal may be carried as a LOW signal over a positive rail. Control logic for negated rails is described in further detail with respect to FIG. 6.

In some implementations, the rails 120 may be coupled to at least one check module (not shown) to ensure that the sparsely encoded signal transmitted across the rails 120 is representative of a valid signal state (e.g., the predetermined HIGH and LOW signal representations). The check module may compare a transmitted signal to a set of predetermined valid states of the critical signals that is stored within the check module (or elsewhere in the computer-readable media 108). If the check module determines that the transmitted signal does not correspond to a valid signal state, for example, if the signal has been injected with a fault, an error may be passed up-chain to be handled appropriately (described further with respect to FIG. 2).

As shown, the security circuitry 112 is coupled to an interconnect 122. The interconnect 122 can be realized using, for example, a bus, a switching fabric, or a bus network that enables the various circuit components to communicate. Each of the circuit components 114 may be directly or indirectly coupled to the interconnect 122. Although described with respect to the cryptographic IP block 116, any portion of the interconnect 122 may utilize multiple rails (e.g., buses or wires) to enable the use of sparsely encoded signals. In other words, multi-rail control for sparsely encoded signals may be used to communicate signals between any two components of the IC 104, not just those within the cryptographic IP block 116. In some examples, the interconnect 122 may transmit all signals using multiple rails and sparse encodings. In other examples, multi-rail control for sparsely encoded signals may only be implemented for critical signals (e.g., signals that directly control operations of the IC 104 or are used to facilitate operations that involve privileged data, such as private keys).

The apparatus 102 may also include a display 124, transceivers 126, input/output ports (I/O ports 128) and/or sensors 130. The display 124 may be operably coupled with one of the processors 106 (e.g., graphics processing unit (GPU)) and configured to graphically present an operating system or applications of the apparatus 102. The transceivers 126 may be configured to enable wired or wireless communication of data (e.g., device data 110) over wired or wireless networks according to any suitable communication protocol. The I/O ports 128 of the apparatus 102 may include universal serial bus (USB) ports, coaxial cable ports, and other serial or parallel connectors (including internal connectors)

useful to couple the electronic device to various components, peripherals, or accessories such as keyboards, microphones, or cameras.

The apparatus 102 also includes sensors 130, which enable the apparatus 102 to sense various properties, variances, stimuli, or characteristics of an environment in which the apparatus 102 operates. For example, the sensors 130 may include various motion sensors, ambient light sensors, acoustic sensors, capacitive sensors, infrared sensors, temperature sensors, radar sensors, or magnetic sensors. Alternatively, or additionally, the sensors 130 may enable interaction with, or receive input from, a user of apparatus 102, such as through touch sensing or proximity sensing.

Figure 2:
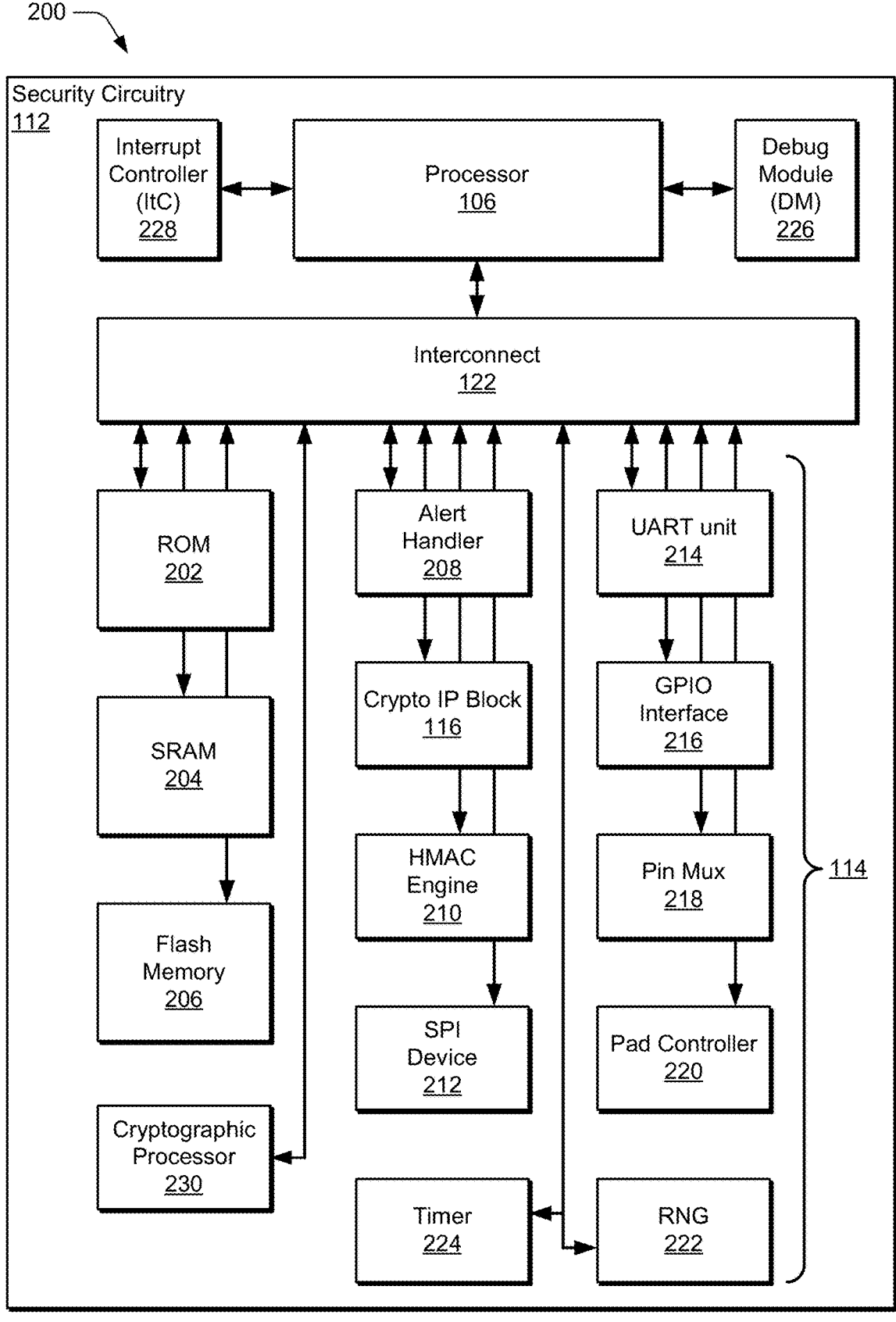
FIG. 2 illustrates an example implementation of example security circuitry which includes multiple circuit components that can be implemented to support aspects of secure multi-rail control for sparsely encoded signals.

FIG. 2 illustrates an example implementation 200 of example security circuitry 112 which includes multiple circuit components, including multiple example circuit components 114, that can be implemented to support aspects of secure multi-rail control for sparsely encoded signals. As shown, the security circuitry 112 includes a processor 106 that is coupled to an interconnect 122. Each of the processors 106, the multiple memories, and the multiple other circuit components 114 may be directly or indirectly coupled to the interconnect 122. In aspects, the components of FIG. 2 may be embodied as a secure computing platform or a secure System-on-Chip that implements an RoT and/or other secure cryptographic features.

In example implementations, the multiple memories can include a read-only memory (ROM 202), a static random-access memory (SRAM 204), and a flash memory 206. In aspects, the ROM 202, SRAM 204, or the flash memory 206 may be implemented within the security circuitry 112 or within the computer-readable media 108. The multiple components 114 can include an alert handler 208, an AES unit (not shown), a cryptographic IP block 116 internal to or external from the AES unit, a hash-based message authentication code (HMAC) engine (HMAC engine 210), and a serial peripheral interface (SPI) device (SPI device 212). The multiple components 114 can also include a universal asynchronous receiver/transmitter (UART) unit (UART unit 214), a general-purpose input/output (GPIO) interface (GPIO interface 216), a pin multiplexer (pin mux 218), and a pad controller 220. The multiple components 114 can further include a random number generator (RNG 222) and a timer 224. Additionally, the components 114 can include any of the memories, as shown in FIG. 2. Although certain examples of memories and other components 114 are depicted in FIG. 2 or described herein, a given implementation of the security circuitry 112 may include more, fewer, and/or different instances of processors, controllers, memories, modules, or peripheral devices, including duplicates thereof.

The illustrated circuit components 114 can be operated synchronously based on one or more clock signals. Although not shown in FIG. 2, the security circuitry 112 may include at least one clock generator to generate the clock signals or may include reset circuitry to reset one or more individual components independently of each other, multiple components jointly, or an entire IC chip. Alternatively, the security circuitry 112 may receive at least one clock signal or a reset signal from a source that is external to the security circuitry 112, which source may or may not be on a separate chip. One or more separate components 114 may operate in respective individual clock domains. For instance, circuit components 114 may be synchronized to a clock that is local to a respective component. Components 114 in different clock domains may operate or communicate asynchronously with respect to one another.

Example implementations of the illustrated components 114 are described below. The processor 106 may be realized as a "main," "central," or "core" processor for the security circuitry 112. The processor 106 may, by way of example only, be implemented with a 32 bit, in-order reduced instruction set computing (RISC) core with a multi-stage pipeline. With, for example, a RISC-V functionality, the processor 106 may implement an M (machine) and a U (user) mode. Activating a reset pin (not shown) (e.g., through de-assertion of an active-low reset pin) may cause the processor 106 to exit reset and begin executing code at its reset vector. The reset vector may begin in the ROM 202, which validates code in the emulated embedded flash (e flash) before jumping to it. In other words, the code is expected to have been instantiated into the e-flash before the reset is released. In some cases, resets throughout the security circuitry 112 can be made asynchronous active-low as per a comportability specification to support interoperability among the various circuit components. A reset may be generated by the alert handler 208 as a security countermeasure; by a watchdog timer; and so forth. Reset signals may also be sent to other circuit components, such as one of the memories or one of the other components 114.

Coupled to the processor 106 may be a debug module 226 (DM) and an interrupt controller 228 (ItC), either of which may also be made comportable. The debug module 226 provides debug-access to the processor 106. By interfacing with certain pins of the IC, logic in the debug module 226 allows the processor 106 to enter a debug mode and provides an ability to inject code into the device (e.g., by emulating an instruction) or into a memory. The interrupt controller 228 may be disposed proximate to the processor 106. The interrupt controller 228 can accept a vector of interrupt sources from within the security circuitry 112. The interrupt controller 228 can also assign leveling and priority to the interrupts before forwarding them to the processor 106 for handling.

The processor 106 can provide any desired level of performance or include any internal circuit components. For example, the processor 106 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 106 can implement a single-cycle multiplier or produce an imprecise exception on an error response to a store, which allows the processor to continue executing past the store without waiting for the response. Although not depicted, the processor 106 specifically, or the security circuitry 112 generally, can include an instruction cache to provide single-cycle access times for instructions.

In the illustrated example 200, the components of the security circuitry 112 include or have access to three memory address spaces for instructions and data. The ROM 202 is the target for the processor 106 after release of a reset. The ROM 202 contains hard-coded instructions to perform a subset of platform checking before checking the next stage of code. The next stage of code—e.g., a boot loader stored in e-flash memory—can be the first piece of code that is not hard-coded into the silicon of the device. This next stage of code is, therefore, signature-checked for integrity to increase security. The ROM 202 can execute this signature check by implementing a Rivest-Shamir-Adleman-check (RSA-check) algorithm on the full contents of the boot loader.

The flash memory 206 can be implemented as e-flash memory for code storage. This e-flash can house the boot loader mentioned herein, as well as an operating system and applications that layer on top. The SPI device 212 can be used to bulk-load the e-flash memory. The debug module 226 may also be used for code loading. The SRAM 204 can be operated as a scratch pad SRAM that is available for data storage by the processor 106 (e.g., for stack and heap information). The SRAM 204 can also store code.

The security circuitry 112 can include circuit components 114 that may be subservient execution units that are coupled to the processor 106 via the interconnect 122. Each of these components 114 can follow an interface framework that ensures comportability with each other and with the processor 106. A comportability scheme can specify how the processor 106 communicates with a given circuit component 114 (e.g., using the interconnect 122), how a circuit component communicates 114 with the processor 106 (e.g., using interrupts), how a circuit component 114 communicates security events (e.g., using alert indications) to other circuit components 114, like the alert handler 208; how a circuit component communicates with peripheral devices (e.g., through a chip I/O); or combinations thereof. The depicted components 114 can comprise circuit components relative to the alert-related functionality provided by the alert handler 208, relative to the processor 106, relative to the one or more memories, relative to a chip I/O, and so forth. Thus, the memories can also comprise components relative to each other or the other depicted circuit components 114.

The circuit or chip I/O includes the pin mux 218 and the pad controller 220. The pin mux 218 provides signaling routes between at least a portion of the components 114 and available multiplexable I/O nodes of the security circuitry 112 (e.g., pins of the chip in which the various components are integrated or an interface to other portions of an SoC). The pad controller 220 manages control or pad attributes like drive strength, technology, pull up versus pull down, and the like of each of the circuits' components. The pin mux 218 and the pad controller 220 may themselves be peripheral devices on the interconnect 122. Accordingly, each may have or may otherwise be associated with at least one collection of registers that provide software configurability.

The UART unit 214 can implement UART features, such as single-lane duplex UART functionality. The outputs and inputs thereof can be configured to connect to any circuit I/O via the pin mux 218. The GPIO interface 216 creates G bits of bidirectional communication to external circuitry via the pin mux 218, where G is a positive integer like 16, 32, or 64. Regarding memory I/O, the SPI device 212 can implement a firmware mode. Here, the firmware mode can enable a feature that provides the ability for external drivers to send firmware upgrade code into a bank of the flash memory 206 for in-field firmware updates. The firmware mode can include addressing of the memories using SPI transactions. Although not depicted, the security circuitry 112 can include an inter-integrated circuit (I2C) host to enable command of I2C devices. This command of I2C devices may include standard, full, and fast modes.

Several "core security" components are also depicted, including the encryption engines and the alert handler 208. The cryptographic IP core 116, which may be implemented as described with reference to FIG. 1, can provide various symmetric encryption and decryption functionalities, such as by using one or more protocols and/or varying key sizes, like 128 b, 192 b, or 256 b. In aspects, the cryptographic IP block 116 may be incorporated within an AES unit and may implement methods described herein. The component can select encryption or decryption of data that arrives in, e.g., 16-byte quantities to be encrypted or decrypted using different block cipher modes of operation. The cryptographic IP block 116 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 210 may utilize, for instance, a secure hash algorithm (SHA) SHA-256 as a hashing algorithm. SHA-256 is a member of the SHA-2 family of hashing algorithms in which the digest (or hash output) is of 256 b length, regardless of the data size of the input to be hashed. The data is sent into the HMAC engine 210 after declaring the beginning of a hash request. This zeroes out the internal state to initial conditions, e.g., 32 b at a time. Once the data has been sent by a component client, the client can indicate the completion of the hash request (with optional partial-word final write). In accordance with an example portability interface scheme, the HMAC engine 210 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256 b key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 208 is responsible for processing and responding to alerts (e.g., errors), including ones provided from other components 114 (e.g., the check module). The alerts can be considered security-sensitive interrupts that are to be handled in a timely manner to respond to a perceived security threat. Unlike "standard" interrupts, alerts may not be handled solely by software executing on the processor 106. Alerts can trigger a first-stage request to be handled by software as a "regular" interrupt. If, however, the software is not able to respond and properly remedy the alert-triggered interrupt, then the alert handler 208 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 106 is busy, wedged, and/or also under attack.

Thus, an alert can be implemented as an elevated interrupt-type signal or alert indication that the alert handler 208 receives from other circuit components 114 and that is indicative of a potential security threat. In operation, the alert handler 208 can gather alerts from other circuit components 114 of the security circuitry 112 and convert them into interrupts that the processor 106 can address. If the processor 106 does not clear the interrupt, however, the alert handler 208 provides hardware responses to address the potential security threat.

In general, the alert handler 208 may store some indication of an alert that is received from any of the components 114. In some cases, this indication may be presented after the IC 104 or the one or more circuit components 114 perform a reset. As a specific example, the alert handler 208 may write a time, location, or type of alert to a register and allow operation of the IC 104 or the circuit components 114 to continue normal operation. Once the operations are finished, or a predetermined period of time has passed, the resulting data may be discarded so that privileged information is not revealed and the operation of the IC 104 is not altered due to the potential event that caused the alert. In this way, a malicious agent may be unable to determine when an alert is provided to the alert handler 208.

The security circuitry 112 can also include the RNG 222. Generally, randomness can contribute to the security functionality by providing variations in execution that can keep attackers from predicting a good time to launch an attack. A random number, for instance, can provide secret material used for identity and cryptographic purposes. The RNG 222 can be seeded into algorithmic computation to obscure sensitive data values. Generally, the RNG 222 provides better performance as its number generation increasingly becomes truly random and to the extent it can also be hardened against attack. In some cryptographic processes, strong randomness guarantees may not be required. The RNG 222 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting circuit components or software can read from this pool to the extent bits are available. Attempted reading of entropy bits that are not available can trigger an interrupt or an alert.

Two other components 114 include the timer 224 and a flash controller (not shown), the latter of which is described in the following paragraph. The timer 224 can, for example, support accurate performance by the processor 106. The timer 224 is formed from multiple bits (e.g., 64 bits) and operates as a free-running timer with a guaranteed frequency to within some percentage. The timer 224 may enable the circuit components 114 to determine appropriate time intervals to perform operations. For example, the FSMs 118 or other components of the cryptographic IP block 116 may transmit or receive signals in accordance with the timer 224. Another timer (not explicitly shown) can act as a watchdog timer to backstop the processor 106 in case the processor becomes unresponsive. The unresponsiveness may be due to development code that is wedged, a security attack, and so forth.

Although not shown, a flash controller may control the flash memory 206, which is available for code and data storage. The primary read path for this data can be in the standard memory address space. Writes to that address space can be ignored, however, because flash is not written to in a standard way. Instead, to write to the flash memory 206, software interacts with the flash controller. The flash functionality can include three primary commands: read, erase, and program. Read commands can be standardized and can use the chip memory address space. Erase commands are performed at a page level, where the page size is parameterizable by the flash controller. Upon receiving an erase request, the flash controller wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are relatively slow. A typical erase time is measured in milliseconds, and program times are in the range of microseconds. Security is also a concern because secret data may be stored in the flash memory 206. Some memory protection can therefore be provided by the flash controller.

The security circuitry 112 is depicted in FIG. 2 with a particular set of circuit components 114. A given security circuitry 112 can, however, have more, fewer, or different circuit components. The circuit components may also be interconnected differently or operate in manners besides those example manners described herein. Further, some circuit components 114 may be omitted while other circuit components 114 are implemented in multiple instances. For example, the alert handler 208 may be duplicated or distributed, or multiple cryptographic IP blocks 116 may be present in some security circuitry 112. Further, a GPIO interface 216 may be omitted from among the components 114 of security circuitry 112 for IC chips in which the security circuitry 112 forms but one core among dozens.

In aspects, any of the circuit components 114 may include a cryptographic processor 230 that executes the cryptographic operations of the component. In some implementations, the cryptographic processor 230 is separate from the processor 106 of FIG. 1. In other implementations, the cryptographic processor 230 is implemented within the processors 106. Further, any of the circuit components 114 may include a cryptographic processor 230 (or processing core) to perform the specific functions of that component.

Figure 3:
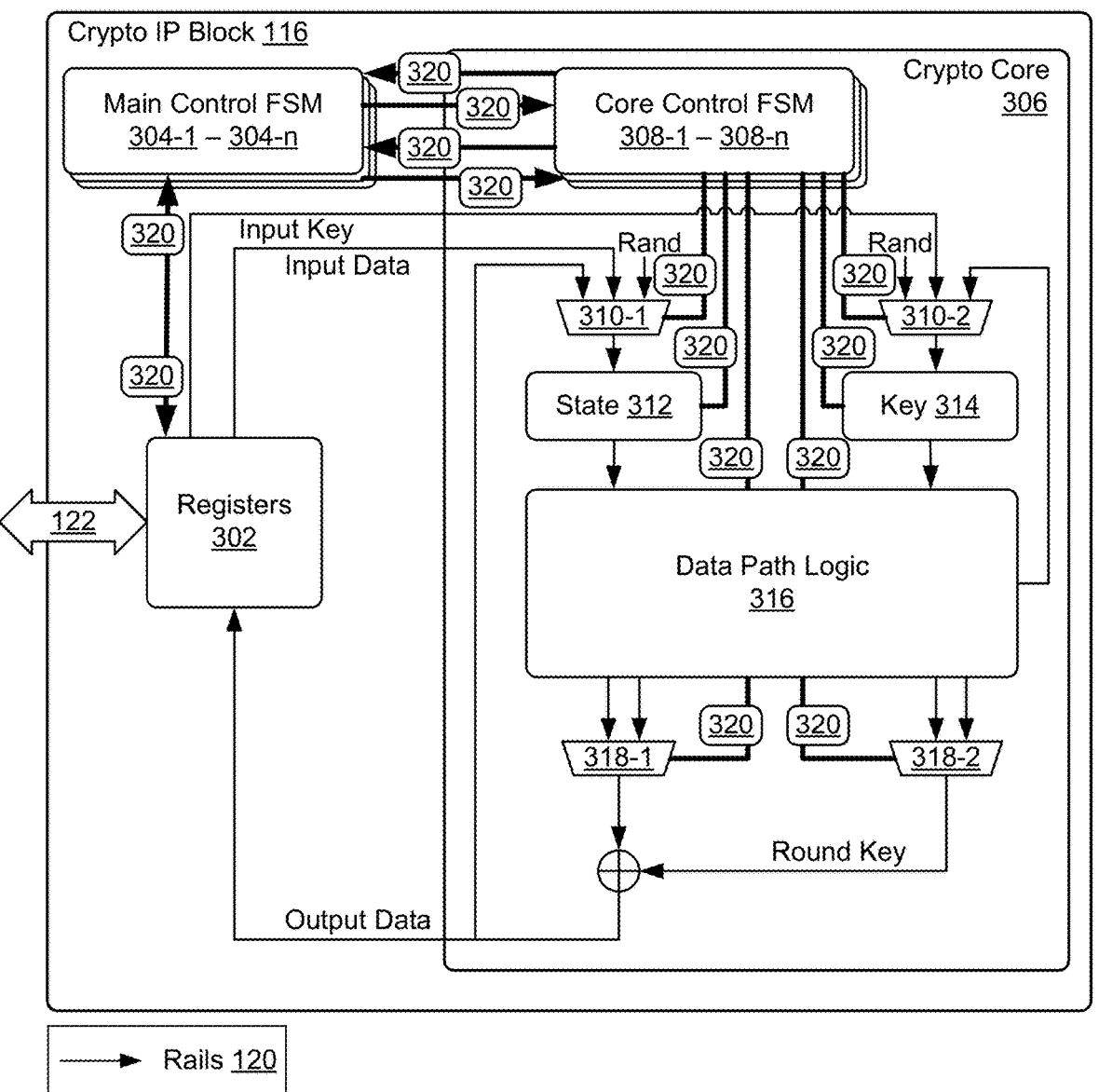
FIG. 3 illustrates an example cryptographic intellectual property (IP) block that can implement secure multi-rail control for sparsely encoded signals in accordance with one or more aspects.

FIG. 3 illustrates an example cryptographic IP block 116 that can implement secure multi-rail control for sparsely encoded signals in accordance with one or more aspects. The cryptographic IP block 116 can provide symmetric encryption and decryption using one or more protocols and varying key sizes, like 128 b, 192 b, or 256 b. The component can select encryption or decryption of data that arrives in, e.g., 16-byte quantities to be encrypted or decrypted using different block cipher modes of operation.

The cryptographic IP block 116 may be attached to the IC interconnect 122 as a peripheral module. Communication with the processor may be performed through a set of control and status registers 302 that may input or output data, keys, and/or status and control information. In aspects, the registers 302 may provide an interface where a key manager may provide or receive keys without exposing them to the processor or other hosts attached to the IC interconnect 122. The cryptographic IP block 116 contains multiple components that are communicatively coupled to one another through one or more rails 120. In aspects, the rails 120 that carry critical signals are represented by thick arrows in FIG. 3, and these rails 120 may include multiple rails that implement secure multi-rail control for sparsely encoded signals.

As illustrated, the cryptographic IP block 116 includes a main control FSM 304 that controls access to software, registers, and other portions of the IC, and a cryptographic core 306 (e.g., an example of the cryptographic processor 230), including a core control FSM 308 that controls the operations of circuit components within the cryptographic core 306. The main control FSM 304 and core control FSM 308 may communicate handshake signals across the rails 120. In aspects, the main control FSM 304 may transmit signals to the core control FSM 308 to initiate and terminate operations of the cryptographic core 306. For example, when data is input to the registers 302, the main control FSM 304 may transmit a handshake signal to the core control FSM 308 along the rails 120 to indicate that data has been input to the register 302 to undergo cryptographic operations. In response, the core control FSM 308 may transmit a handshake signal to the main control FSM 304 along the rails 120 to acknowledge or accept the request for the cryptographic core 306 to perform operations on the data input to the registers 302. The main control FSM 304 may then transmit a signal to the registers 302 to release the data to the cryptographic core 306 and/or to write lock the registers 302 from inputting or outputting data.

To begin operations, the core control FSM 308 may transmit multiplexer (MUX) selector signals to the MUXs 310 to multiplex the input data (e.g., using MUX 310-1) or the input key (e.g., using MUX 310-2). In aspects, the data and/or keys may be masked based on randomness provided to the MUXs 310. Once the data and/or the key has been multiplexed, the core control FSM 308 may transmit a write enable signal along the rails 120 to the state register 312 and/or to the key register 314 to enable the data/key to be written to the respective register.

The data and key may then be passed to data path logic 316 where various operations are performed on the values. For example, the data may undergo non-linear operations within the data path logic 316. The data path logic 316 may include any number of substitution boxes or Galois-Field (GF) multipliers. The data path logic 316 may perform multiple rounds of encryption/decryption on the data using the key. To protect against various attacks, the data path logic 316 may execute a number of parallel operations using multiple substitution boxes. The core control FSM 308 may communicate various signals to circuit components within the data path logic 316 to enable or disable operations within the data path logic 316 or to acknowledge that an operation has been performed.

Once the data has passed through the data path logic 316, it may be multiplexed again using a set of MUXs 318. The core control FSM 308 may transmit MUX selector signals that control the operation of the MUXs 318 using rails 120. In doing so, the data may be multiplexed at the MUX 318-1 to create the encrypted/decrypted data after a first round of operations, and the key may be multiplexed at the MUX 318-2 to create the round key that is used for encryption/decryption during the next round of operations. The data and the round key may then be passed back through the MUXs 310 and into the state register 312 and the key register 314 for another iteration of encryption/decryption.

When the data has finished operations (e.g., the data has completed all rounds of encryption/decryption), the core control FSM 308 may transmit a handshake signal to the main control FSM 304 across the rails 120 to indicate that data is ready to be output to the registers 302. In response, the main control FSM 304 may transmit a handshake signal across the rails 120 to acknowledge or accept the request to release the data to the registers. The main control FSM 304 may then transmit a signal to the registers 302 (e.g., a write enable signal or a read enable signal) along the rails 120 to allow the data to be written to the registers and then released along the interconnect 122. As a result, the data may be output from the cryptographic core 306 and written to the registers 302.

As described above, various signals may be transmitted by the main control FSM 304 or the core control FSM 308 to manage operations of the cryptographic IP block 116 and, as a result, handshake signals and other control signals inside cryptographic and other IP blocks are a common target for fault injection attacks. By successfully injecting a single fault into such a signal, an IC may terminate (e.g., cause a termination) a current operation early, start a new operation early, or release intermediate data, thereby enabling a series of other attacks. In some instances, these attacks are directed to cryptographic IP blocks because cryptographic IP blocks may maintain privileged information or may be used to implement security features, such as a secure boot process or root-of-trust.

In some cases, critical signals may be targeted by fault injection attacks (e.g., handshakes and other control signals) that utilize targeted lasers to flip transistors within the IP block. For example, by changing a bit of a critical signal, logic flow may be redirected to terminate execution of a chip process, release intermediate data relevant to a chip process, or to repeat a process out of order. The information released as a result of the fault injection attacks or logic redirections may provide privileged information about the on-chip logic to an attacker, that can be used to bypass security measures or design other attacks on the IC. With respect to a cryptographic IP block, fault injection attacks may enable the release of cryptographic private keys to an unprivileged individual or system. Therefore, in some examples, the described secure multi-rail control logic may be implemented within cryptographic IP blocks only. In other implementations, the described sparse encoding may be utilized at any point where sensitive operations are occurring on a hardware device, for example, any processes that involve access control or a privileged level of operation (e.g., power, register access, system resets). For example, the described secure multi-rail control logic may be utilized between any two components of the IC that perform such sensitive operations.

In general, critical signals may have bit representations that do not require a set minimum Hamming distance, or circuit synthesis tools may reduce the effectiveness of larger bit representations that abide by a minimum Hamming distance. Thus, a fault injection attack may be able to alter these signals into an unintended but otherwise valid state, thereby directly influencing operation of the IC. For example, when handshakes are altered, out of order, or untimely, interactions may be initiated between the cryptographic IP block 116 and the cryptographic core 306 (e.g., an untimely output or termination from the cryptographic core 306). As another example, manipulating the operations of the MUX devices (e.g., MUX 310 or MUX 318) may directly influence the data output to the registers 302 (e.g., influence what type of data is latched).

To protect against fault injection attacks, sparse encoding may be used for any of the critical signals that directly influence circuit operation. For example, instead of using a single bit representation to communicate critical signals over a single wire (or rail), n wires may be used for these critical signals where n is greater than one. In this way, each of the rails 120 that are used to connect circuit components may communicate a single bit of a sparsely encoded signal. Further, critical signals may require the use of a minimum Hamming distance such that the flip of a single bit (or a number of bits less than the Hamming distance) does not result in a valid solution. Specifically, an attacker may be required to flip a same number of bits as the minimum Hamming distance simultaneously (or in a short amount of time) to alter the critical signal to a different valid signal. As a non-limiting example, the minimum Hamming distance may be between 2 and 5 bits, however, it should be appreciated that the minimum Hamming distance may be scaled to increase security hardening. For a two-state signal (e.g., one bit, HIGH or LOW), the quantity of rails 120 (e.g., between any two components) may be the same as the minimum Hamming distance. Thus, the quantity of rails 120 may be a scalable parameter for security hardening.

In a non-security hardened case, a bit representation of a valid signal may be 1'b1 and another valid signal may be represented as 1'b0. As such, a single bit flip may alter one valid signal to a different valid signal. In contrast, as an example of the sparse encoding described, a bit representation of one valid signal may be 3'b101, while a second valid signal may be 3'b010. In this case, the Hamming distance is three, as three bits must be altered to achieve a different valid signal. A larger Hamming distance may harden the security parameters of the cryptographic IP block 116, as attackers would need to flip multiple bits of a signal simultaneously to maliciously alter a signal to a different valid signal. This may be particularly difficult, as fault injection attacks using a laser may require separate lasers to each trigger different transistors at a same time (or within a short period of time) to flip multiple bits of a signal. Stated generally, an attacker would have to insert a same number of faults as the Hamming distance to trigger a successful attack (e.g., generate a successful signal).

In some implementations, valid signals should be chosen such that the bit representation does not include all bits having a same binary value. For example, in a three-bit scenario, the bit representation of a valid signal should not be 3'b111 or 3'b000. In general, attackers may have more success flipping all the bits in a signal to a single value than flipping multiple single bits of a word to a different value. For example, attackers may be able to clear a word by converting all bits in the word to a binary value of zero or a binary value of one. Thus, valid signals may be defined to contain both zero and non-zero bits to increase the security of the IC against fault injection attacks.

To communicate valid signals as a mix of HIGH and LOW bits, negated rails may be implemented that include negated logic. For example, if a first component wishes to transmit a HIGH value (e.g., 1'b1), the HIGH three-bit signal may be chosen to be (3'b100). In this example, the rail that transmits the most significant bit is a positive rail because it transmits the same value that is communicated by the first component. In contrast, the rail that carries the second most significant bit and the rail that carries the third most significant bit are negated rails because they carry a different value than is transmitted from the first component. In this example, a HIGH value (e.g., 1'b1) would be transmitted as 3'b100, and a LOW value (e.g., 1'b0) would be transmitted as 3'b011. As shown, the positive and negative rails may be determined once the multi-bit representation of the HIGH or the LOW value is determined. Once determined, the multi-bit signals may be automatically generated by placing inverters on the negative rails or at the output of the transmitting component (e.g., the FSM). As a result, the sparsely encoded signals may be represented as a combination of both HIGH and LOW signals.

In implementations, the inverters can be merged into (e.g., integrated with) a given rail. For example, through proper configuring (e.g., constraining, instructing) of a synthesis tool, the synthesis tool can be made to merge inverters into a negated rail.

Given that increasing the Hamming distance of valid signal values may require larger word size (e.g., more bits to describe a value), elements of the cryptographic IP block 116 may be designed to accommodate the larger number of bits used for each signal. For example, MUX devices (e.g., MUXs 310 and MUXs 318) operating on the values may now be required to support a larger number of bits. Additionally, other logic (e.g., data path logic 316) or registers (e.g., registers 302, state register 312, or key register 314) within the cryptographic IP block 116 may need to change to accommodate the larger Hamming distances. In this way, the components may operate natively in the higher-bit format.

In aspects, the multi-bit size of MUX control signals provides additional challenges when utilizing sparse encoding to increase security. For example, a MUX control signal may require more bits to reach a same minimum Hamming distance when compared to a control signal that can be represented by a single bit. In these cases, the quantity of rails 120 may be greater than, or equal to, the minimum Hamming distance.

As an example for multi-bit, multi-value MUX control signals, to achieve a minimum Hamming distance of n for a three-valued sparse signal, a suitable encoding together with a minimum required number of bits may be determined. For instance, for n equal to three, the following 5-bit values may be used: 5'b01110, 5'b11000, and 5'b00001. For such signals, every FSM rail may drive the fill multi-bit signal (e.g., the Core Control FSMs 308-1-308-n drive the full 5-bit signal). In addition, a check unit (e.g., check unit 320) may combine n copies into a single signal, for example, via a bitwise OR. As a result, if a first Control Core FSM drives 5'b01110 and a second Control Core FSM drives 5'b11000, then the combined signal is 5'b11110, which is invalid. In additional implementations, the check unit can compare all signals against each other before the bitwise OR combining.

While some of the components may change to simply accommodate larger bit signals, this change may be more complex for the FSMs (e.g., main control FSM 304 and core control FSM 308) that are responsible for driving the control signals, for example, if the FSMs may include circuit synthesis devices that collapse circuit logic to operate more efficiently. In these cases, circuit synthesis may, through optimization, reduce the effectiveness of the redundant multi-bit representations used in sparse encodings when operations are performed, as further described in FIG. 4. As such, the circuit synthesis tool may eliminate the sparse encodings, thus leaving the circuit susceptible to fault injection attacks, and in some cases, increasing the attack surface. To counter this, some techniques may create custom multi-bit gates that do not allow for synthesis. Other techniques may disable circuit synthesis tools to ensure that security measures are not unintendedly removed. However, each of these techniques may be sub-optimal as custom multi-bit gates can be expensive, non-scalable, and spatially disadvantageous. Moreover, disabling circuit synthesis tools may disable other circuit synthesis operations that are not impactful to security measures and enable higher performance of the IC.

In contrast to these techniques, multi-rail control for sparsely encoded signals may utilize multiple copies of each FSM to natively operate in the multi-bit format and eliminate circuit synthesis across the multiple rails 120 and FSMs (e.g., main control FSM 304 or core control FSM 308). For example, each FSM (e.g., main control FSM 304 or core control FSM 308) may be implemented as a plurality of FSMs (e.g., main control FSM 304-1 through 304-n or core control FSM 308-1 through 304-n). Each of the plurality of FSMs may be communicatively coupled to a single rail of the rails 120 and communicate and receive a single bit of the sparsely encoded signals. In this way, the whole signal is never dependent on a single logical operation due to circuit synthesis. In addition, the use of a plurality of FSMs may not require custom multi-bit gates as identical copies of the comportable FSM may be placed into the circuit. In this way, these techniques may provide a scalable solution where the number of FSMs and rails 120 may be scaled based on security, spatial, and cost constraints. Moreover, these techniques can scale with the advancement of attacks. For example, if an attacker is now able to flip three bits simultaneously, the quantity of FSMs, rails 120, and the minimum Hamming distance may be increased to, for example, four.

In addition to using sparse encoding to increase the minimum Hamming distance between valid signals, check modules 320 may be placed in areas where handshakes or control signals are communicated. For example, check modules 320 may be placed on rails 120 between the main control FSM 304 and the registers 302, check modules 320 may be placed on rails 120 between the main control FSM 304 and the core control FSM 308, or check modules 320 between the core control FSM 308 and a cryptographic core register (e.g., state register 312 or key register 314) or MUX device (e.g., MUXs 310 or MUXs 318).

The check modules 320 may monitor the signals transmitted across the rails 120 and check to ensure that the signals communicated are representative of a valid encoding (e.g., no fault has been injected). For example, a check module of the check modules 320 may store a set of predetermined valid states that a signal passed across the rails 120 may represent. For a signal that transmits either a HIGH or LOW value, the check module may store the multi-bit representation of the HIGH value and the multi-bit representation of the LOW state. For signals that cannot be represented in only two states (e.g., MUX selector signals), the corresponding check module 320 may include a set of valid states that contains more than two valid states. In storing the set of predetermined valid states, the check modules 320 may compare a signal passed along the rails 120 to the predetermined set of valid states and determine if the signal matches any valid state within the set of valid states. If the signal matches any of the valid states, the IC or the cryptographic IP block 116 may continue normal operation. If a signal passed from a first component to a second component is determined not to be representative of a valid encoding (e.g., it is not within the list of valid states because a fault injection attack has occurred), an error may be flagged and passed up-chain for error handling.

In aspects, error handling may be changed based on the specific implementation. For example, when an error is triggered by the check module (e.g., it is suspected that a fault injection attack occurred) the control FSMs (e.g., the Main Control FSM block and the Core Control FSM block of FIG. 3) may be locked or reset to limit the ability to alter the processes executing on the cryptographic IP block 116. In other implementations, a shutdown or reset of the entire IC may be triggered when a sufficient number of errors is reached. In general, to restore the state of a locked FSM or a locked chip, the device may need to be reset. In another example, the process may continue to the termination of a current process, but the output will be discarded. In this manner, an attacker may be unable to tell when an attack triggers an error and the mechanisms of the security system may remain hidden. In general, errors detected by the check modules 320 may be handled in a number of ways, as described with respect to the alert handler of FIG. 2. In general, however, the check modules 320 may keep record of errors determined by storing an indication of the error in a register of the IC to ensure the cryptographic IP block 116 is aware that an error occurred.

By implementing check modules 320 along the rails 120, the cryptographic IP block 116 may determine if a fault injection attack occurs before circuit operations may be altered by the attack. Moreover, to trigger a successful fault injection, attackers may be required to inject multiple faults into a signal simultaneously, or within a short amount of time. For example, a first valid solution passed may have the bit representation 3'b100. During a first attack, the attacker may flip the first bit of the signal to have a bit representation of 3'b000. Later in a second attack, the attacker may flip a second bit of the signal to 3'b010. Finally, in a third attack, the attacker may flip a third bit of the signal to generate the valid solution 3'b011. Without a check module 320 at a location near the handshake or control signal, the cryptographic IP block 116 may act on the valid signal 3'b011 even though it has been altered by a fault injection attack.

If check modules 320 are implemented, however, the cryptographic IP block 116 may be able to identify the signal resulting from the first or second attack as an invalid signal and trigger an alert. As such, the check modules may be able to determine a fault injection attack even when the final result is a valid signal. In some implementations, the check modules may detect an attack even when bits are flipped in quick succession. In this way, an attacker attempting to flip multiple bits to reach a different valid signal may need to flip each bit simultaneously, which may require multiple lasers and precise timing. Further, the check modules may increase the overall difficulty of performing a successful fault injection attack because the changed signal will be checked soon after the attack. In this way, a potential attacker may have to flip the multiple bits correctly in a single attempt.

In some implementations, the check modules 320 between the main control FSM 304 and the core control FSM 306 may be removed from the cryptographic IP block 116 because faults injected into these signals will propagate through to a signal controlling the data path (e.g., write enabled signals or MUX selector signals) and be flagged by the check modules 320 placed on those rails 120. As such, circuit space and cost may be conserved without negatively impacting the security of the IC.

FIG. 4 illustrates example logic 400 for an AND operation on sparsely encoded signals that is susceptible to fault injection attacks due to circuit synthesis. In aspects, an AND operator may be used to determine whether a signal is a HIGH or a LOW value (e.g., by using an AND operator on the signal with the HIGH value as an input). In this example, the control logic illustrated utilizes three-bit control signals. The logic 400 is used to perform an AND operation of signal A 402 and signal B 404. In aspects, signal A 402 or signal B 404 may generally represent any of the handshakes or control signals described in this document. Signal A 402 is a three-bit signal with most significant bit A0 402-0, second most significant bit A1 402-1, and third most significant bit A2 402-2. Similarly, signal B is a three-bit signal with most significant bit B0 404-0, second most significant bit B1 404-1, and third most significant bit B2 404-2. In aspects, signal A 402 and signal B 404 may be sparsely encoded signals implemented using a minimum Hamming distance requirement.

The logic 400 represents synthesized logic that has been optimized for redundancies, similar to logic that might result from optimization by modern circuit synthesis tools. Each signal is originally carried by rails, shown as arrows, in three-bit format (thick arrows illustrate rails that carry multi-bit signals). The respective bits are then separated from the signals, and the most significant bit and the second most significant bit of each signal are input to a NAND operation. Specifically, bit A0 402-0 and bit A1 402-1 are input to a NAND operator, and bit B0 404-0 and bit B1 404-1 are input to a NAND operator. The output is then input to a NOR and an OR operator, respectively, with the third most significant bit of each signal. As illustrated, the output of the NAND operation on bit A0 402-0 and bit A1 402-1 and bit A2 402-2 are input to the NOR operator. Similarly, the output of the NAND operation on bit B0 404-0, bit B1 404-1, and bit B2 404-2 are input to the OR operator. The output of the NOR operator and the OR operator are passed to an ORNOT operator and an ANDNOT operator, with the output of each being input to each operator. As a result, the output of the ANDNOT gate becomes bit C1 406-1, the second most significant bit of the output signal C 406, and the output of the ORNOT gate becomes the bit C2 406-2, the third most significant bit of the output signal C 406. As shown, the three-bit representation has been optimized to a two-bit format, and a bit of the representation has been excluded from the output, in this case, the most significant bit C0 (not shown).

Throughout the logic 400, there are multiple locations where a single fault may be injected to flip the output of both bits (e.g., C1 406-1, C2 406-2) within C 406 (illustrated as dotted arrows in FIG. 4). Therefore, not only did the use of sparse encodings not increase security against fault injection attacks as a result of circuit synthesis, but the attack surface actually grew because multiple rails can now be injected with faults to successfully change the signal to a different valid state. In this way, synthesis tools may cause the use of sparse encoding to simply move the point in which a successful fault injection attack can occur, and in some cases, increase the attack surface, instead of forcing multiple faults to create a successful injection attack. Also due to circuit synthesis, the check module placed on the rails has been optimized away because of the elimination of redundant bits in the circuit. Thus, careful control of sparsely encoded signals is needed to protect against possible fault injection attacks.

It should be noted that though a three-bit implementation is shown, similar problems caused by circuit synthesis may occur in implementations that use any number of bits. Therefore, multi-rail control may be useful to implement sparsely encoded signals irrespective of the specific quantity of bits used.

Figure 5:
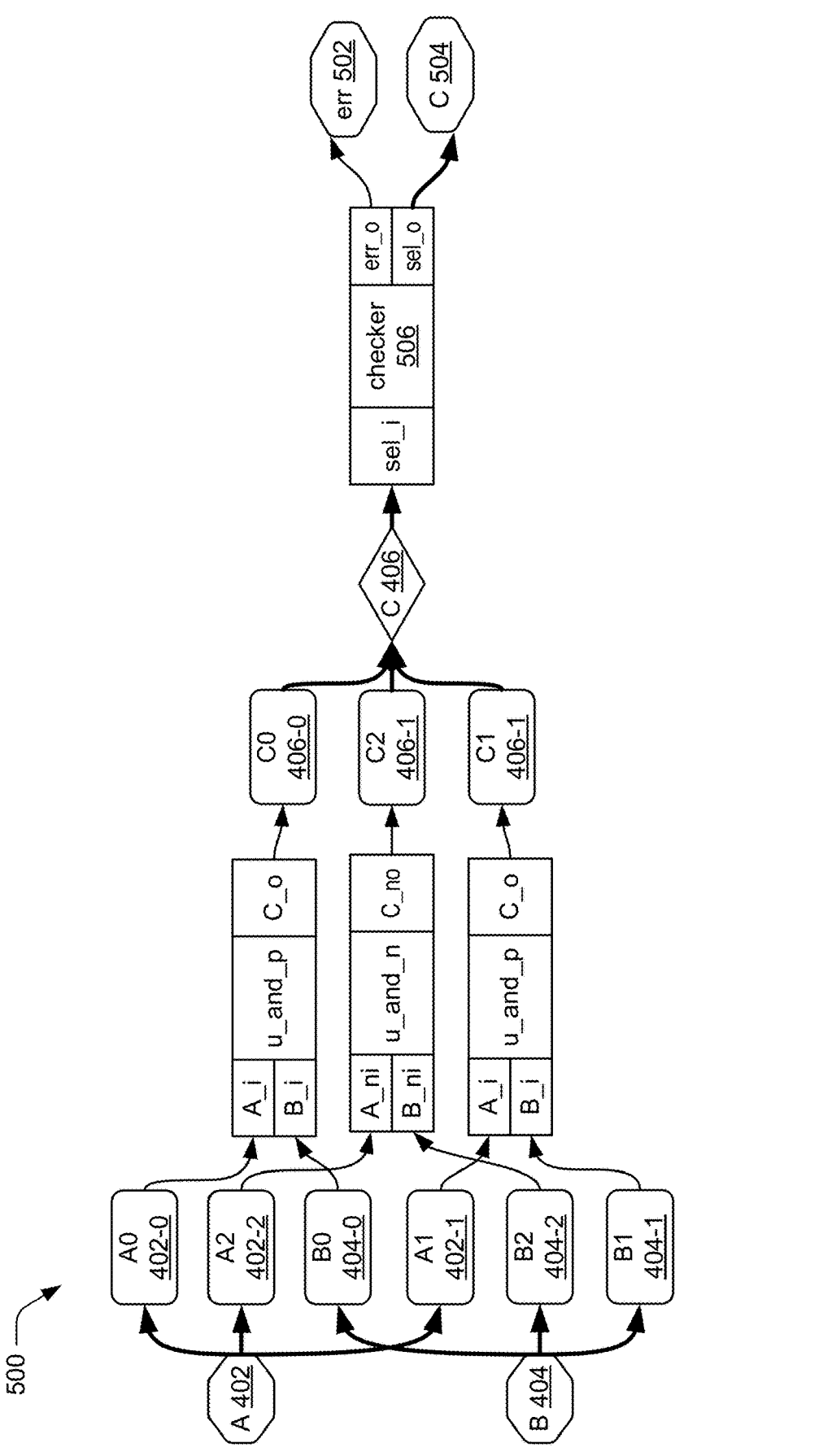
FIG. 5 illustrates example logic for an AND operation using secure multi-rail control for sparsely encoded signals in accordance with one or more aspects.

FIG. 5 illustrates example logic 500 for an AND operation using secure multi-rail control for sparsely encoded signals in accordance with one or more aspects. In this example, the control logic illustrated utilizes three-bit control signals. Similar to the logic 400 of FIG. 4, the logic 500 is used to perform an AND operation of signal A 402 and signal B 404. Signal A 402 or signal B 404 may generally represent any of the handshakes or control signals described in this document. Signal A 402 is a three-bit signal with most significant bit A0 402-0, second most significant bit A1 402-1, and third most significant bit A2 402-2. Similarly, signal B is a three-bit signal with most significant bit B0 404-0, second most significant bit B1 404-1, and third most significant bit B2 404-2. In this example, the rails that carry bit A2 402-2 and bit B2 404-2 are negated rails and these bits are negated values of the bits transmitted by the first component (e.g., if the first component transmits a signal indicative of a HIGH value, these bits would carry a LOW value and vice versa). The negated bits may be generated automatically using an inverter. In aspects, signal A 402 and signal B 404 may be sparsely encoded signals implemented using a minimum Hamming distance requirement. Different from the logic 400 of FIG. 4, each of the bits of the signals may be individually driven (e.g., by a single FSM of the plurality of FSMs described in FIG. 3) across a respective rail to protect against circuit synthesis across the different rails.

In the example multi-rail control logic, every bit of the sparsely encoded signals is processed and communicated separately. In this way, the multi-rail control logic may operate natively in a multi-bit environment to reduce the effectiveness of fault injection attacks. In the logic 500, the signals are first carried as three-bit signals across the multi-bit rails (illustrated as thick arrows) until each bit is separated and transmitted across an individual rail. Each set of corresponding bits of the signals (e.g., most significant bit of A 402 and most significant bit of B 404, least significant bit of A 402 and least significant bit of B 404, and so on) are input to an AND operator. For example, bit A0 402-0) and bit B0 404-0) are input to an AND operator, bit A1 402-1 and bit B1 404-1 are input to an AND operator, and bit A2 402-2 and bit B2 404-2 are input to a negated rail AND operator. In aspects, the negated rail AND operator is implemented on negated rails. In the negated rail AND operator, the inputs are inverted, an AND operator is performed, and the output of the AND operator is then negated. It should be noted that though described with respect to an AND operator, the negated operator may be performed similarly for any other operation (e.g., OR, XOR, NOR, NAND). For example, the inputs may be negated, the operation may be performed, and the output may be negated. The negated rail AND operator is further described with respect to FIG. 6. The outputs of the two AND operators and the negated rail AND operator are bit C0 406-0, bit C1 406-1, and bit C2 406-2, respectively. These bits are then collected to become the output signal C 406.

The output signal C 406 is then provided as input to the checker 506 (e.g., an example of the check modules 320 of FIG. 3). The checker 506 can compare the output signal C 406 to a set of predetermined valid states stored within the IC. If the checker 506 determines that the signal C does not correspond to one of the predetermined valid states stored in the IC, an error 502 may be flagged. The error may be passed up-chain for error handling, for example, as described with respect to the alert handler of FIG. 2. The output signal C 504 may be provided to the second component of the IC that the signal was transmitted to. When it is determined that the signal C 406 corresponds to one of the valid states, the output signal C 504 may correspond to the output signal C 406. When the output signal C 406 does not correspond to a valid state, the output signal C 504 may not be output, may be a different value that does not correspond to output signal 406, or may be a value corresponding to the output signal 406. In this way, errors may be handled in a number of ways based on implementation.

Unlike the logic 400 of FIG. 4, the output signal C 406 of FIG. 5 has a same number of bits as the input signal A 402 and the input signal B 404. Thus, the checker 506 may be effective to determine if the signal has been altered by a fault injection attack because the output signal C 406 corresponds to the format of the predetermined states. Additionally, the logic 500 does not contain location where injecting a single fault can flip each bit of the output signal C 406. In this way, the logic 500 may not be susceptible to a single fault injection like the logic 400 of FIG. 4.

FIGS. 6A and 6B illustrate example logic for implementing secure multi-rail control for sparsely encoded signals in accordance with one or more aspects. For example, FIG. 6A illustrates how control logic for the multiple rails are determined automatically for positive and negated rails. The logic determines whether each rail is a positive or negative rail by determining if a HIGH value is represented as a 1'b1 signal. If so, the rail is determined to be a positive rail, and appropriate positive rail logic (e.g., the AND operator described in FIG. 5) may be used to control operations on the signals carried by the rail. If not, negated rail logic (e.g., the negated rail AND operator described in FIG. 5) may be used to control operation on the signals carried by the rail.

FIG. 6B illustrates an example of a positive rail AND operator and a negated rail AND operator. For example, the positive rail operator may perform an AND operation on the bits input to the operator and provide the output from the operation. In contrast, the negated rail AND operator may invert the inputs to the AND operation, perform the AND operation on the inverted inputs, and invert the resulting output. In this way, the negated rail logic may use inverters inside the negated rail to generate true negated logic. Although described with respect to an AND operator, the negated rail logic may be applied to any other operation. For example, a negated OR operator may negate the inputs to the operation, perform the OR operation, and negate the output. The logic may be similarly applied to NAND operations, XOR operations, NOR operations, or any other logical operation.

In implementations, the synthesis tool can be configured (e.g., constrained) to merge inverters into a given rail. For example, by placing a synthesis constraint on the and_n hierarchy (as illustrated in FIG. 6B), the synthesis tool can merge inverters into a negated rail. In this way, synthesis tools may not perform logic optimizations across the hierarchy boundary of the and_n module, for example. As a result, the maintenance of a single copy of the code (e.g., and_p) is achievable (e.g., the and_n can be implemented as a wrapper with some inverters). Such an implementation is useful when a system includes one or more FSMs having tens, hundreds, or thousands of logic gates, and, in some cases, logic inside rails may not be limited to simple logic gates (e.g., AND, NAND, OR, NOR). Such a hierarchy constraint is described as an example only, for any of a variety of additional configurations, including a hierarchy constraint, may be implemented to remove redundant rails and/or security measures.

FIG. 7 illustrates an example method 700 for transmitting sparsely encoded signals using multiple rails. Method 700 is illustrated as a set of blocks that specify operations that may be performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device. In some aspects, operations or acts of the method 700 are implemented by or managed by a cryptographic IP block 116, an FSM (e.g., main control FSM 304 and/or core control FSM 308), and/or any of the circuit components 114. For clarity, the method is described with reference to the elements of FIGS. 1 through 6.

At 702, a first signal indicative of a first bit of a sparsely encoded signal is transmitted by a first component and to a second component over a first rail that communicatively couples the first component to the second component. In aspects, the first rail is a single rail from the plurality of rails 120. The first rail may be a positive rail or a negated rail. The first signal may be transmitted by a respective FSM of a plurality of FSMs (e.g., main control FSM 304 or core control FSM 308). The first component or the second component may be a main control FSM 304, a core control FSM 308, a register (e.g., registers 302, state register 312, or key register 314), a MUX device (e.g., MUXs 310 or MUXs 318), or any other circuit component 114 within the IC 104. In aspects, the sparsely encoded signal may be indicative of a handshake signal, a write enabled signal, a register setting, or a MUX selector signal. Moreover, the first signal may be a HIGH signal or a LOW signal.

At 704, a second signal indicative of a second bit of the sparsely encoded signal is transmitted by the first component to the second component over the first rail that communicatively couples the first component to the second component. The second rail may be a different rail than the first rail from the plurality of rails 120. In aspects, the second signal may be a HIGH or a LOW signal. In some implementations, at least one of the first or second rail is a negated rail so that the sparsely encoded signal may be represented as a combination of HIGH and LOW values. In aspects, the first component and the second component each include a plurality of FSMs, and each FSM of the first component is communicatively coupled to a respective FSM of the second component through a respective rail.

At 706, the first signal and the second signal are received at the second component. In aspects, the first rail and the second rail are coupled to a check module 320, and the output of the check module 320 is coupled to the second component. The check module 320 may store a plurality of predetermined valid states within its own memory or any other memory of the IC. The check module 320 may compare the sparsely encoded signal to the predetermined valid states stored in memory. If the sparsely encoded signal does not match a predetermined valid state of the sparsely encoded signal, the check module 320 may output an error 502 to the alert handler 208. If the sparsely encoded signal does match a predetermined valid state, the sparsely encoded signal may be output from the check module 320 to the second component.

At 708, the IC 104 performs a circuit operation based on the first signal and the second signal. For example, the IC 104 may perform a write to memory, a MUX operation, or any other circuit operation. In aspects, the circuit operation may be used to perform encryption or decryption of data. As such, the first component and the second component may be implemented within a cryptographic IP block 116 of the IC 104. Alternatively, either one of or both of the first and second component may be implemented outside the cryptographic IP block 116 but within the IC 104.

Figure 8:
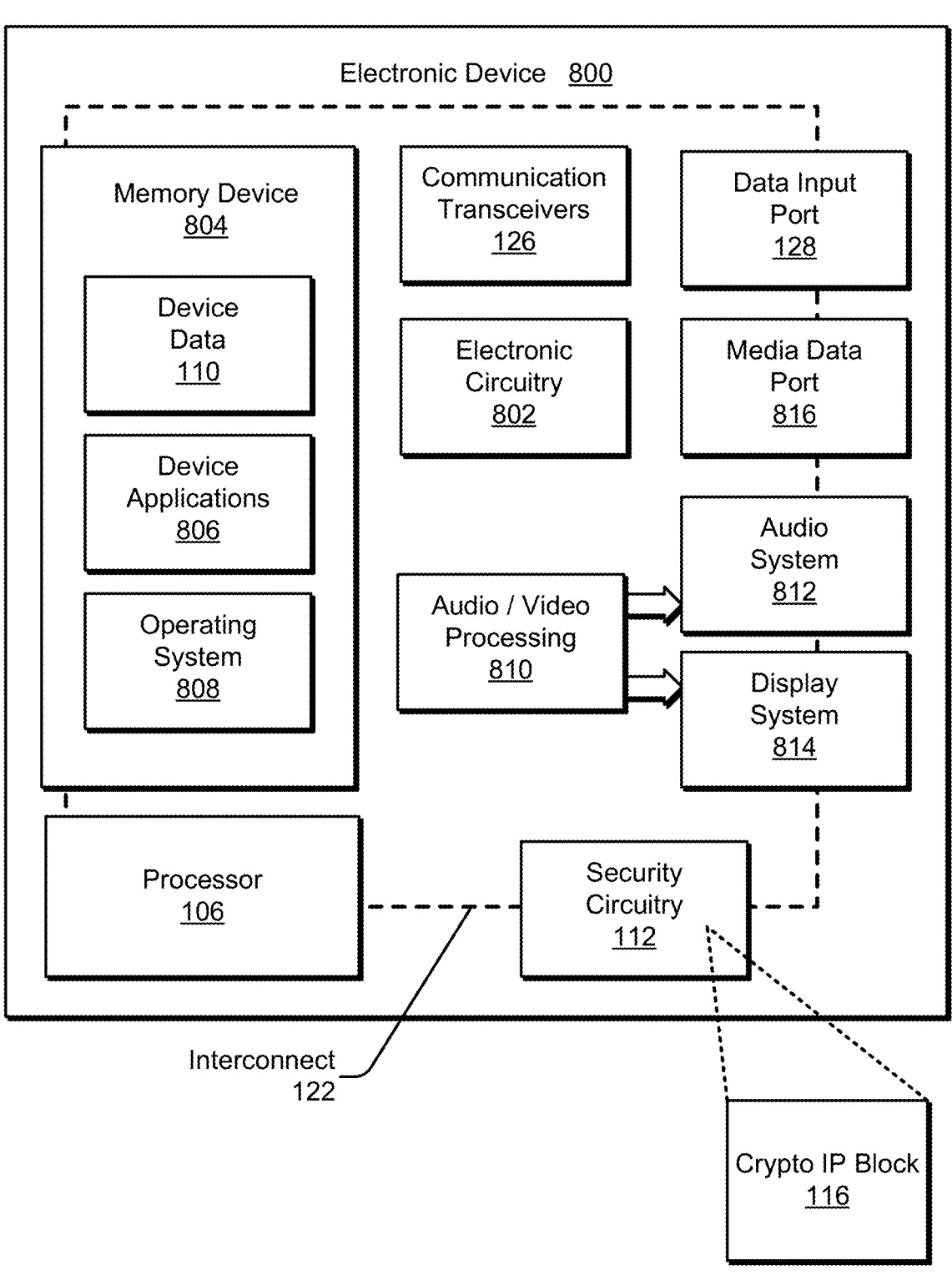
FIG. 8 illustrates an example electronic device that may implement secure multi-rail control for sparsely encoded signals.

FIG. 8 illustrates various components of an example electronic device 800 that can implement secure multi-rail control for sparsely encoded signals in accordance with one or more aspects. The electronic device 800 may be implemented as any single or multiple of a fixed, mobile, standalone, or embedded device; in any form of a consumer, computer, portable, user, server, communication, phone, navigation, gaming, audio, camera, messaging, media playback, and/or other type of electronic device 800, such as the smartphone that is depicted in FIG. 1 as the apparatus 102. One or more of the illustrated components may be realized as discrete components or as integrated components on at least one IC of the electronic device 800. Generally, the various components of the electronic device 800 are coupled via an interconnect 122 and/or one or more fabrics that support communication between the components in accordance with one or more aspects of secure multi-rail control for sparsely encoded signals.

The electronic device 800 can include one or more communication transceivers 126 that enable wired and/or wireless communication of device data 110, such as received data, transmitted data, or other information identified herein. Example communication transceivers 126 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (WiFi™) standards, wireless wide area network (WAN) (WWAN) radios (e.g., those that are Third Generation Partnership Project compliant (3GPP-compliant)) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 800 may also include one or more data input ports 128 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 128 may include USB ports, coaxial cable ports, fiber optic ports for optical fiber interconnects or cabling, and other serial or parallel connectors (including internal connectors) for flash memory, DVDs, CDs, and the like. These data input ports 128 may be used to couple the electronic device to components, peripherals, or accessories such as keyboards, microphones, cameras, or other sensors.

The electronic device 800 of this example includes at least one processor 106 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. The processor 106 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital signal processor (DSP), an application-specific integrated circuit (ASIC), a field-programmable gate array (FPGA), a complex programmable logic device (CPLD), and other implementations in silicon and/or other materials.

Alternatively or additionally, the electronic device 800 can be implemented with any one or combination of electronic circuitry, which may include software, hardware, firmware, or fixed logic circuitry that is implemented in connection with processing and control circuits, which are generally indicated at 802 (as electronic circuitry 802). This electronic circuitry 802 can implement executable or hardware-based modules (not shown in FIG. 8), such as through processing/computer-executable instructions stored on computer-readable media, through logic circuitry and/or hardware (e.g., such as an FPGA), and so forth.

In aspects, the electronic device 800 includes an interconnect 122, which may include any one or more of a system bus, interconnect, crossbar, data transfer system, or other switch fabric that couples the various components within the device to enable various aspects of signaling and/or communication with sparse encoding. A system bus or interconnect can include any one or a combination of different bus structures, such as a memory bus or memory controller, a peripheral bus, parity blocks, error correction code (ECC) blocks, a universal serial bus, and/or a processor or local bus that utilizes any of a variety of bus architectures.

The electronic device 800 also includes one or more memory devices 804 that enable data storage, examples of which include random access memory (RAM), non-volatile memory (e.g., read-only memory (ROM), flash memory, erasable programmable read-only memory (EPROM), electrically erasable programmable read-only memory (EEPROM)), and a disk storage device. Thus, the memory device(s) 804 can be distributed across different logical storage levels of a system as well as at different physical components. The memory device(s) 804 provides data storage mechanisms to store the device data 110, other types of code and/or data, and various device applications 806 (e.g., software applications or programs). For example, an operating system 808 can be maintained as software instructions within the memory device 804 and executed by the processor 106.

In some implementations, the electronic device 800 also includes an audio and/or video processing system 810 that processes audio data and/or passes through the audio and video data to an audio system 812 and/or to a display system 814 (e.g., a video buffer or a screen of a smartphone or camera). The audio system 812 and/or the display system 814 may include any devices that process, display, and/or otherwise render audio, video, display, and/or image data. Display data and audio signals can be communicated to an audio component and/or to a display component via an RF (radio frequency) link, S video link, HDMI (high-definition multimedia interface), composite video link, component video link, DVI (digital video interface), analog audio connection, video bus, or other similar communication link, such as a media data port 816. In some implementations, the audio system 812 and/or the display system 814 are external or separate components of the electronic device 800. Alternatively, the display system 814, for example, can be an integrated component of the example electronic device 800, such as part of an integrated touch interface.

The electronic device 800 of FIG. 8 is an example implementation of the apparatus 102 of FIG. 1, an example implementation of a device that can implement secure multi-rail control for sparsely encoded signals as described with reference to FIG. 1 through FIG. 7. The electronic device 800 can thus include security circuitry 112, which can be a separate IC chip or included as part of another IC chip or device, like the processor 106, the electronic circuitry 802, or the memory device 804. Accordingly, one or more of the illustrated components may be integrated on the same IC chip, like an SoC, or at least on a single printed circuit board (PCB).

The security circuitry 112 may include a cryptographic IP block 116 that performs cryptographically safe operations using encryption or decryption. The cryptographic IP block 116 may include various circuit components that are configured to communicate sparsely encoded signals according to one or more aspects of secure multi-rail control for sparsely encoded signals. For example, the cryptographic IP block 116 may include multiple rails that each transmit a single bit of the sparsely encoded signals. Each of the multiple rails may be communicatively coupled to one of a plurality of FSMs that communicate a respective bit of the sparsely encoded signal over the respective rail. The principles of secure multi-rail control for sparsely encoded signals as described herein can therefore be implemented by, or in conjunction with, the electronic device 800 of FIG. 8.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a secure cryptographic processor have been described in language specific to certain features and/or methods, the subject of the appended claims is not necessarily limited to the specific features or methods described. Rather, the specific features and methods are disclosed as example implementations for secure cryptographic processing.

Examples of secure multi-rail control for sparsely encoded signals are provided below:

Example 1: An integrated circuit comprising: a first component comprising a first plurality of finite state machines (FSMs); a second component; a plurality of separate data lines configured to communicate, between the first component and the second component, a sparsely encoded signal having a predetermined minimum Hamming distance, each FSM of the first plurality of FSMs is communicatively coupled to the second component through a respective data line of the plurality of separate data lines, each of the plurality of separate data lines configured to communicate a respective single bit of the sparsely encoded signal.

Example 2: The integrated circuit as recited by any of the previous examples, wherein: the second component comprises a second plurality of FSMs. Optionally, each FSM of the first plurality of FSMs may be communicatively coupled to a respective FSM of the second plurality of FSMs through the respective data line of the plurality of separate data lines.

Example 3: The integrated circuit as recited by any of the previous examples, wherein the sparsely encoded signal is indicative of a handshake between the first component and the second component.

Example 4: The integrated circuit as recited by any of the previous examples, wherein the plurality of separate data lines include: at least one positive data line; and at least one negated data line that is configured to carry a second signal that is different than a first signal carried by the at least one positive data line.

Example 5: The integrated circuit as recited by any of the previous examples, wherein: one or more FSMs of the first plurality of the FSMs is/are communicatively coupled to the second component through a respective negated data line of the at least one negated data line; and/or wherein the respective negated data line or the one or more FSMs of the first plurality of FSMs includes an inversion circuit configured to invert the output of a single bit of the sparsely encoded signal, the single bit to be communicated using the respective negated data line.

Example 6: The integrated circuit as recited by any of the previous examples, wherein the at least one positive data line comprises logic that causes the first signal to perform a positive circuit operation; and/or wherein the at least one negated data line comprises logic that causes the second signal to perform a negated circuit operation.

Example 7: The integrated circuit as recited by any of the previous examples, wherein the plurality of separate data lines comprises a number of data lines that is the same as the minimum Hamming distance of the sparsely encoded signal.

Example 8: The integrated circuit as recited by any of the previous examples, further comprising a cryptographic intellectual property block that includes the first component, the second component, and the plurality of separate data lines.

Example 9: The integrated circuit as recited by any of the previous examples, further comprising: a check module coupled to the plurality of separate data lines, the check module configured to determine a validity of the sparsely encoded signal communicated using the plurality of separate data lines.

Example 10: The integrated circuit as recited by any of the previous examples, wherein the check module is configured to: store a predefined set of valid states; compare the predefined set of valid states and the sparsely encoded signal communicated using the plurality of separate data lines; and determine whether the sparsely encoded signal matches any one valid state of the predefined set of valid states based on the comparison between the predefined set of valid states and the sparsely encoded signal.

Example 11: The integrated circuit as recited by any of the previous examples, wherein the check module is configured to report an error in response to the determination that the sparsely encoded signal does not match any one valid state of the predefined set of valid states.

Example 12: The integrated circuit as recited by any of the previous examples, wherein the predefined set of valid states includes a high state and a low state.

Example 13: The integrated circuit as recited by any of the previous examples, wherein: the second component comprises a multiplexer device. Optionally, the sparsely encoded signal may be indicative of a multiplexer selector control signal between the first component and the second component.

Example 14: The integrated circuit as recited by any of the previous examples, wherein: the second component comprises a storage register or a configurations and settings register. Optionally, the sparsely encoded signal is indicative of at least one of: a register setting configured by the first component; or a write enabled control signal between the first component and the second component.

Example 15: A method for communicating a sparsely encoded signal performed by the integrated circuit as recited by any of the previous examples. For example, the method may comprise: transmitting, by a first component of the integrated circuit, a first signal indicative of a first bit of a sparsely encoded signal over a first rail that communicatively couples the first component to a second component of the integrated circuit; transmitting, by the first component of the integrated circuit, a second signal indicative of a second bit of the sparsely encoded signal over a second rail that communicatively couples the first component to the second component; receiving by the second component of the integrated circuit, the first signal and the second signal; and performing, a circuit operation based on the first signal and the second signal. The circuit operation may be performed by the integrated circuit.

Although aspects of the described apparatuses, systems, and methods for implementing secure multi-rail control for sparsely encoded signals have been described in language specific to features and/or methods, the subject of the appended claims is not necessarily limited to the specific features or methods described. Rather, the specific features and methods are disclosed as example implementations of secure multi-rail control for sparsely encoded signals, and other equivalent features and methods are intended to be within the scope of the appended claims. Further, various aspects of secure multi-rail control for sparsely encoded signals are described, and it is to be appreciated that each described aspect can be implemented independently or in connection with one or more other described aspects.

What is claimed is:

1. An integrated circuit comprising:
a first component comprising a first plurality of finite state machines (FSMs);
a second component; and
a plurality of separate data lines configured to communicate, between the first component and the second component, a sparsely encoded signal having a predetermined minimum Hamming distance, each FSM of the first plurality of FSMs being communicatively coupled to the second component through a respective data line of the plurality of separate data lines, each of the plurality of separate data lines configured to communicate a single bit of the sparsely encoded signal, the plurality of separate data lines comprising at least one positive data line and at least one negated data line that is configured to carry a second signal that is different than a first signal carried by the at least one positive data line.

2. The integrated circuit of claim 1, wherein:
the second component comprises a second plurality of FSMs;
wherein each FSM of the first plurality of FSMs is communicatively coupled to a respective FSM of the second plurality of FSMs through the respective data line of the plurality of separate data lines.

3. The integrated circuit of claim 2, wherein the sparsely encoded signal is indicative of a handshake between the first component and the second component.

4. The integrated circuit of claim 1, wherein:
one or more FSMs of the first plurality of the FSMs is communicatively coupled to the second component through a respective negated data line of the at least one negated data line; and
the respective negated data line or the one or more FSMs of the first plurality of FSMs includes an inversion circuit configured to invert an output of a single bit of the sparsely encoded signal, the single bit to be communicated using the respective negated data line.

5. The integrated circuit of claim 1, wherein:
the at least one positive data line comprises logic that causes the first signal to perform a positive circuit operation; and
the at least one negated data line comprises logic that causes the second signal to perform a negated circuit operation.

6. The integrated circuit of claim 1, wherein the plurality of separate data lines comprises a number of data lines that is the same as the minimum Hamming distance of the sparsely encoded signal.

7. The integrated circuit of claim 1, further comprising a cryptographic intellectual property block that includes the first component, the second component, and the plurality of separate data lines.

8. The integrated circuit of claim 1, further comprising:
a check module coupled to the plurality of separate data lines, the check module configured to determine a validity of the sparsely encoded signal communicated using the plurality of separate data lines.

9. The integrated circuit of claim 8, wherein the check module is configured to:
store a predefined set of valid states;
compare the predefined set of valid states and the sparsely encoded signal communicated using the plurality of separate data lines; and
determine whether the sparsely encoded signal matches any one valid state of the predefined set of valid states based on the comparison between the predefined set of valid states and the sparsely encoded signal.

10. The integrated circuit of claim 9, wherein the check module is configured to report an error in response to the determination that the sparsely encoded signal does not match any one valid state of the predefined set of valid states.

11. The integrated circuit of claim 10, wherein the check module is further configured to, in response to the determination that the sparsely encoded signal does not match any one valid state of the predefined set of valid states, place at least one of the first component or the second component into a secure state.

12. The integrated circuit of claim 11, wherein the secure state comprises a locked state or a reset state.

13. The integrated circuit of claim 10, wherein the check module is further configured to cause an output of a process performed by the first component and the second component to be discarded upon completion of the process or after a predetermined period of time has passed after the completion of the process.

14. The integrated circuit of claim 9, wherein the predefined set of valid states includes a high state and a low state.

15. The integrated circuit of claim 8, wherein the check module is further configured to combine a plurality of signals received from the plurality of separate data lines into a single signal.

16. The integrated circuit of claim 1, wherein:
the second component comprises a multiplexer device; and
the sparsely encoded signal is indicative of a multiplexer selector control signal between the first component and the second component.

17. The integrated circuit of claim 1, wherein:
the second component comprises a storage register or a configurations and settings register; and
the sparsely encoded signal is indicative of at least one of:
a register setting configured by the first component; or
a write enabled control signal between the first component and the second component.

18. The integrated circuit of claim 1, wherein the sparsely encoded signal includes signaling having a set of encoded values with non-adjacent codewords or a Hamming distance of at least two.

19. The integrated circuit of claim 1, wherein the first plurality of FSMs includes a plurality of identical FSMs.

20. The integrated circuit of claim 1, wherein each valid state of the sparsely encoded signal comprises at least one first bit having a high value and at least one second bit having a low value.

* * * * *